(12) United States Patent
Kinpara et al.

(10) Patent No.: US 11,271,460 B2
(45) Date of Patent: Mar. 8, 2022

(54) METHOD OF MANUFACTURING A ROTATIONAL ELECTRIC MACHINE ROTOR

(71) Applicant: TOYOTA JIDOSHA KABUSHIKI KAISHA, Toyota (JP)

(72) Inventors: Hiroshi Kinpara, Toyota (JP); Takashi Takahashi, Toyota (JP); Tomohiro Segawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/144,482

(22) Filed: Jan. 8, 2021

(65) Prior Publication Data

US 2021/0135550 A1 May 6, 2021

Related U.S. Application Data

(62) Division of application No. 16/157,422, filed on Oct. 11, 2018, now Pat. No. 10,916,996.

(30) Foreign Application Priority Data

Oct. 13, 2017 (JP) .............................. JP2017-199694

(51) Int. Cl.
*H02K 15/02* (2006.01)
*H02K 15/03* (2006.01)
(Continued)

(52) U.S. Cl.
CPC ............... *H02K 15/03* (2013.01); *H02K 1/30* (2013.01); *H02K 7/003* (2013.01); *H02K 11/21* (2016.01);
(Continued)

(58) Field of Classification Search
CPC ...... H02K 7/003; H02K 15/02; H02K 1/2706; F04C 2240/20; F16H 57/022;
(Continued)

(56) References Cited

U.S. PATENT DOCUMENTS 5,181,783 A * 1/1993 Sherman ............... F16C 17/026
384/100
7,709,991 B2 * 5/2010 Ionel ........................ H02K 1/22
310/216.001
(Continued)

FOREIGN PATENT DOCUMENTS

CN 103051131 A 4/2013
FR 709389 A 8/1931
(Continued)

OTHER PUBLICATIONS

Notice of Allowance dated Nov. 2, 2021, which issued during the prosecution of U.S. Appl. No. 17/144,560.

*Primary Examiner* — Thiem D Phan
(74) *Attorney, Agent, or Firm* — Sughrue Mion, PLLC

(57) ABSTRACT

A method of manufacturing a rotational electric machine rotor includes: forming a rotor shaft having a non-circular sectional outer shape; forming a rotor core by stacking a predetermined number of magnetic body thin plates each including a center hole having a non-circular shape corresponding to the non-circular sectional outer shape of the rotor shaft; and forming a protruding part for fixing the rotor core and the rotor shaft to each other by inserting the rotor shaft into the non-circular center hole of the rotor core and squashing the rotor shaft extending out of an axial-direction end face of the rotor core by using a predetermined swaging jig to expand the rotor shaft outward beyond an outer periphery of the non-circular section along the axial-direction end face of the rotor core.

6 Claims, 14 Drawing Sheets

(51) Int. Cl.
*H02K 11/21* (2016.01)
*H02K 7/00* (2006.01)
*H02K 24/00* (2006.01)
*H02K 1/30* (2006.01)
*H02K 1/276* (2022.01)

(52) U.S. Cl.
CPC .............. *H02K 15/02* (2013.01); *H02K 24/00* (2013.01); *H02K 1/276* (2013.01); *H02K 2213/03* (2013.01); *Y10T 29/49009* (2015.01); *Y10T 29/49012* (2015.01)

(58) Field of Classification Search
CPC .............. F16H 57/023; Y10T 29/49078; Y10T 29/49009; Y10T 29/49012
USPC ......... 29/598, 428, 505, 525, 596, 604, 607, 29/609
See application file for complete search history.

(56) References Cited

U.S. PATENT DOCUMENTS

| 8,436,497 | B2 | 5/2013 | Horng et al. |
| 10,256,679 | B2 | 4/2019 | Vestermark Vad |
| 2013/0149155 | A1 | 6/2013 | Chang et al. |
| 2017/0317567 | A1 | 11/2017 | Cho et al. |
| 2019/0115812 | A1 | 4/2019 | Kinpara |

FOREIGN PATENT DOCUMENTS

| JP | 56-35848 U | 4/1981 |
| JP | 2005-295745 A | 10/2005 |
| JP | 2014-64409 A | 4/2014 |
| JP | 2015-076914 A | 4/2015 |
| JP | 2015-100227 A | 5/2015 |
| JP | 2015-126684 A | 7/2015 |
| JP | 2016017595 A | 2/2016 |
| JP | 2016-158354 A | 9/2016 |

\* cited by examiner

METHOD OF MANUFACTURING A ROTATIONAL ELECTRIC MACHINE ROTOR

CROSS REFERENCE TO RELATED APPLICATION

This application is a Divisional of U.S. patent application Ser. No. 16/157,422 filed Oct. 11, 2018, which claims priority from Japanese Patent Application No. 2017-199694 filed on Oct. 13, 2017, the contents of all of which including the specification, claims, drawings, and abstract are incorporated herein by reference in their entirety.

TECHNICAL FIELD

The present disclosure generally relates to a method of manufacturing a rotational electric machine rotor, and to the rotational electric machine rotor, and more particularly to a method of manufacturing a rotational electric machine rotor including a rotor core in which magnetic body thin plates are stacked and a rotor shaft, and to the rotational electric machine rotor.

BACKGROUND

In a rotational electric machine rotor, fixation that withstands rotation of the rotor is needed at assembly of a rotor core in which magnetic body thin plates are stacked and a rotor shaft.

JP 2015-076914 A discloses a method of achieving stable swaging fixation between a rotor shaft with a flange and a rotor core with a center hole when variance exists in the axial-direction dimension of the rotor core as a stacked body of magnetic body thin plates. In this method, the rotor core is inserted into the rotor shaft through an end face on one side, the end face on the one side is received by the flange, and an end face on the other side is pressurized in the axial direction by a pressing jig, thereby reducing the dimension variance of the rotor core. In this state, swaging processing using a swaging jig including a slant face on the outer peripheral side is performed between a swaging part on a plate outer periphery at one end of the rotor shaft, and an end plate provided at one end of the rotor core and including a slant face on the inner diameter side.

JP 2005-295745 A discloses that, during assembly of a rotor as a stacked body of magnetic body thin plates and a rotor shaft including a hollow part, a mandrel provided with a plurality of protrusions extending in the axial direction on the outer periphery is inserted into the hollow part of the rotor shaft, and the hollow part of the rotor shaft is plastically deformed to protrude outward.

JP 2016-158354 A discloses a combination of an R-T-B sintered ring magnet having polar anisotropy and including a circular sectional outer peripheral surface and a polygonal sectional inner peripheral surface, and a rotor shaft including a polygonal sectional outer peripheral surface, for rotation prevention when the ring magnet is fixed to a rotor shaft. The disclosure is made on an optimum combination of the polygonal number of the polygon of the inner peripheral surface of the ring magnet and the polygonal number of the polygon of the outer peripheral surface of the rotor shaft. A thermoplastic resin spacer is disposed between the inner peripheral surface of the polygon of the ring magnet and the outer peripheral surface of the polygon of the rotor shaft, because the R-T-B sintered ring magnet is likely to crack due to stress.

JP 2015-126684 A discloses a method of increasing fastening axial force between a rotor core made of a stacked body of magnetic body thin plates and including a center hole and a rotor shaft with a flange. In this method, the rotor core is inserted into the rotor shaft through an end face on one side, the end face on the one side is received by the flange, a washer having an outer diameter larger than the outer diameter of the flange is disposed on an end face on the other side, and the stacked body of magnetic body thin plates is pressurized. In this state, a nut is fastened to the rotor shaft through the washer, and thereafter, the pressurization is canceled. The washer, which has a large outer diameter, can pre-pressurize the vicinity of the center hole of the stacked body of magnetic body thin plates.

SUMMARY

Technical Problem

Assembly of a rotor shaft and a rotor core requires fixing force and fixation of the positional relation therebetween in the circumferential direction. In the conventional technology, fixing force in the axial direction is obtained by providing a male screw part to the rotor shaft and fastening with appropriate washers and nuts, and relative rotation in the circumferential direction is reduced by providing an engagement mechanism including a rotation prevention key and a key groove. Accordingly, the rotor shaft has a complicated outer shape and thus needs, for example, machining and annealing processing at a contact part, which leads to increase of the fabrication cost, the number of components, the assembly man-hours, and the like. When the rotor core is made of a stacked body of magnetic body thin plates, for example, the cost of stack swaging processing of the plurality of magnetic body thin plates increases. For these reasons, a method of manufacturing a rotational electric machine rotor is required, along with the rotational electric machine rotor that allow reduction of the cost of assembling the rotor core and the rotor shaft.

Solution to Problem

A method of manufacturing a rotational electric machine rotor according to the present disclosure includes: forming a rotor shaft having a non-circular sectional outer shape; forming a rotor core by stacking a predetermined number of magnetic body thin plates each including a center hole having a non-circular shape corresponding to the non-circular sectional outer shape of the rotor shaft; and forming a protruding part for fixing the rotor core and the rotor shaft to each other by inserting the rotor shaft into the non-circular center hole of the rotor core and squashing the rotor shaft extending out of an axial-direction end face of the rotor core by using a predetermined swaging jig to expand the rotor shaft outward beyond an outer periphery of the non-circular section along the axial-direction end face of the rotor core.

With the above-described configuration, the center hole of the rotor core and the outer shape of the rotor shaft are formed in non-circular sectional shapes, which allows omission of a rotation prevention mechanism. In addition, the protruding part for fixing the rotor core and the rotor shaft to each other is formed by squashing the rotor shaft extending out of the axial-direction end face of the rotor core to expand the rotor shaft outward beyond the outer periphery of the non-circular section along the axial-direction end face of the rotor core. Accordingly, the rotor shaft and the axial-direction end face of the rotor core are fixed to each other by swaging, which eliminates the need to perform screw fastening using a male screw part of the rotor shaft and a nut. In addition, the plurality of magnetic body thin plates are fixed in the circumferential direction and the axial direction by the protruding part formed on the rotor shaft, which eliminates the need to perform stack swaging processing of the plurality of magnetic body thin plates. These configurations allow reduction of the cost of assembling the rotor core and the rotor shaft.

A method of manufacturing a rotational electric machine rotor according to the present disclosure includes: forming a rotor shaft having a non-circular sectional outer shape; forming a rotor core by stacking a predetermined number of magnetic body thin plates each including a center hole having a non-circular shape corresponding to the non-circular sectional outer shape of the rotor shaft; inserting the rotor shaft into the non-circular center hole of the rotor core and fitting, to the non-circular sectional outer shape of the rotor shaft, a metal ring including a center hole having a non-circular shape corresponding to the non-circular sectional outer shape of the rotor shaft; forming a protruding part for fixing the metal ring and the rotor shaft to each other by applying a predetermined pressure between both axial-direction end faces of the rotor core and squashing the rotor shaft extending out of an axial-direction end face of the metal ring by using a predetermined swaging jig to expand the rotor shaft outward beyond an outer periphery of the non-circular section along the axial-direction end face of the metal ring; and canceling the predetermined pressure and fixing the rotor core and the rotor shaft to each other through the metal ring.

With the above-described configuration, the metal ring, the rotor core, and the rotor shaft are formed in non-circular sectional shapes, which allows omission of a rotation prevention mechanism. In addition, the protruding part for fixing the rotor core and the rotor shaft to each other is formed by squashing the rotor shaft extending out of the axial-direction end face of the metal ring fitted to the rotor core to expand the rotor shaft outward beyond the outer periphery of the non-circular section along the axial-direction end face of the metal ring. Accordingly, the rotor shaft and the axial-direction end face of the metal ring are fixed to each other by swaging so that the rotor shaft and the rotor core are fixed to each other through the metal ring, which eliminates the need to perform screw fastening using a male screw part of the rotor shaft and a nut. In addition, the plurality of magnetic body thin plates are fixed to each other in the circumferential direction and the axial direction by the protruding part formed on the rotor shaft, which eliminates the need to perform stack swaging processing of the plurality of magnetic body thin plates. These configurations allow reduction of the cost of assembling the rotor core and the rotor shaft.

In the method of manufacturing a rotational electric machine rotor according to the present disclosure, a position at which the protruding part is formed on the rotor shaft preferably includes a position farthest from a barycenter position of the section of the rotor shaft.

With the above-described configuration, the range of material flow of the rotor shaft due to squashing is likely to be obtained at the position farthest from the barycenter position of the section of the rotor shaft, which facilitates formation of the protruding part.

In the method of manufacturing a rotational electric machine rotor according to the present disclosure, the non-circular shape is preferably a polygon or serration. Rotation of the rotor core and the rotor shaft relative to each other is prevented by long side parts of the polygon or irregularities in a gear teeth shape on the outer peripheral surface of the serration. A protruding part may be formed at each apex part of the polygon or each apex part of the irregularities on the outer peripheral surface of the serration by using a predetermined swaging jig. In place of these shapes, the non-circular shape may be, for example, an elliptical shape. These configurations prevent rotation of the rotor shaft and the rotor core relative to each other in the circumferential direction.

In the method of manufacturing a rotational electric machine rotor according to the present disclosure, in the procedure of forming the rotor core, the predetermined number of magnetic body thin plates may be aligned with each other but are yet to be fixed to each other. This is because the plurality of magnetic body thin plates are fixed to each other in the circumferential direction and the axial direction by the protruding part of the rotor shaft, which eliminates the need to perform stack swaging processing of the plurality of magnetic body thin plates.

In the method of manufacturing a rotational electric machine rotor according to the present disclosure, the predetermined swaging jig preferably includes a swaging surface for squashing the rotor shaft in a circumferential direction, and the swaging surface is preferably tilted at a predetermined acute angle toward an outer peripheral side relative to a normal direction of an outer peripheral surface of the rotor shaft. When the swaging jig is used, the rotor shaft receives pressing force in the circumferential direction, and forms the protruding part expanding in the radial direction and the circumferential direction outward beyond the outer periphery of the non-circular section. Since the swaging surface is tilted by a predetermined acute angle toward the outer peripheral side relative to the normal direction of the outer peripheral surface of the rotor shaft, material flow is likely to occur in the radial direction due to squashing of the rotor shaft, which facilitates formation of the protruding part.

In the method of manufacturing a rotational electric machine rotor according to the present disclosure, the rotor shaft is inserted into a center hole of the polygon or serration of the rotor core through fitting by pressing. A curvature radius of roundness of the center hole of the polygon or serration of the rotor core at an apex part of the polygon or serration is preferably shorter than a curvature radius of roundness of the polygon or serration of the rotor shaft at an apex part of the polygon or serration. With the above-described configuration, a gap due to the curvature radius difference is formed between the inner peripheral surface of the rotor core and the outer peripheral surface of the rotor shaft at each apex part of the polygon or serration. The gap receives material inflow of the rotor shaft through fitting by pressing, thereby reducing stress due to fitting by pressing.

A rotational electric machine rotor according to the present disclosure includes: a rotor shaft having a non-circular sectional outer shape; a rotor core in which a predetermined number of magnetic body thin plates each including a center hole having a non-circular shape corresponding to the non-circular sectional outer shape of the rotor shaft are stacked; and a protruding part with which the rotor core and the rotor shaft are fixed to each other while the rotor shaft extending out of an axial-direction end face of the rotor core is squashed to expand the rotor shaft outward beyond an outer periphery of the non-circular section along the axial-direction end face of the rotor core with the rotor shaft being inserted into the non-circular center hole of the rotor core.

A rotational electric machine rotor according to the present disclosure includes: a rotor shaft having a non-circular sectional outer shape; a rotor core in which a predetermined number of magnetic body thin plates each including a center hole having a non-circular shape corresponding to the non-circular sectional outer shape of the rotor shaft are stacked; a metal ring including a center hole having a non-circular shape corresponding to the non-circular sectional outer shape of the rotor shaft; and a protruding part with which the metal ring and the rotor shaft are fixed to each other while the rotor shaft extending out of an axial-direction end face of the metal ring is squashed to expand the rotor shaft outward beyond an outer periphery of the non-circular section along the axial-direction end face of the metal ring with the rotor shaft being inserted into the non-circular center hole of the rotor core and the metal ring being fitted to the non-circular sectional outer shape of the rotor shaft. The rotor core and the rotor shaft are fixed to each other through the metal ring.

Advantageous Effects of Invention

A method of manufacturing a rotational electric machine rotor configured as described above and the rotational electric machine rotor achieve reduction of the cost of assembling a rotor core and a rotor shaft.

BRIEF DESCRIPTION OF DRAWINGS

Embodiments of the present disclosure will be described by reference to the following figures, wherein.

DESCRIPTION OF EMBODIMENTS

Embodiments of the present disclosure will be described below in detail with reference to the accompanying drawings. In the following description, a rotor shaft has an octagonal sectional outer shape, and a rotor core includes an octagonal center hole, but this configuration is merely exemplary for description. In place of octagonal shapes, the rotor shaft may have a non-circular sectional outer shape, and the rotor core may include a non-circular center hole. Dimensions, shapes, materials, the number of stacked magnetic body thin plates, the number of magnetic poles of a rotor, the number of permanent magnets per magnetic pole, and the like described below are merely exemplary for description, and may be changed as appropriate in accordance with, for example, specifications of a rotational electric machine rotor. Hereinafter, identical elements in all drawings are denoted by identical reference signs, and duplicate description thereof will be omitted.

Figure 1:
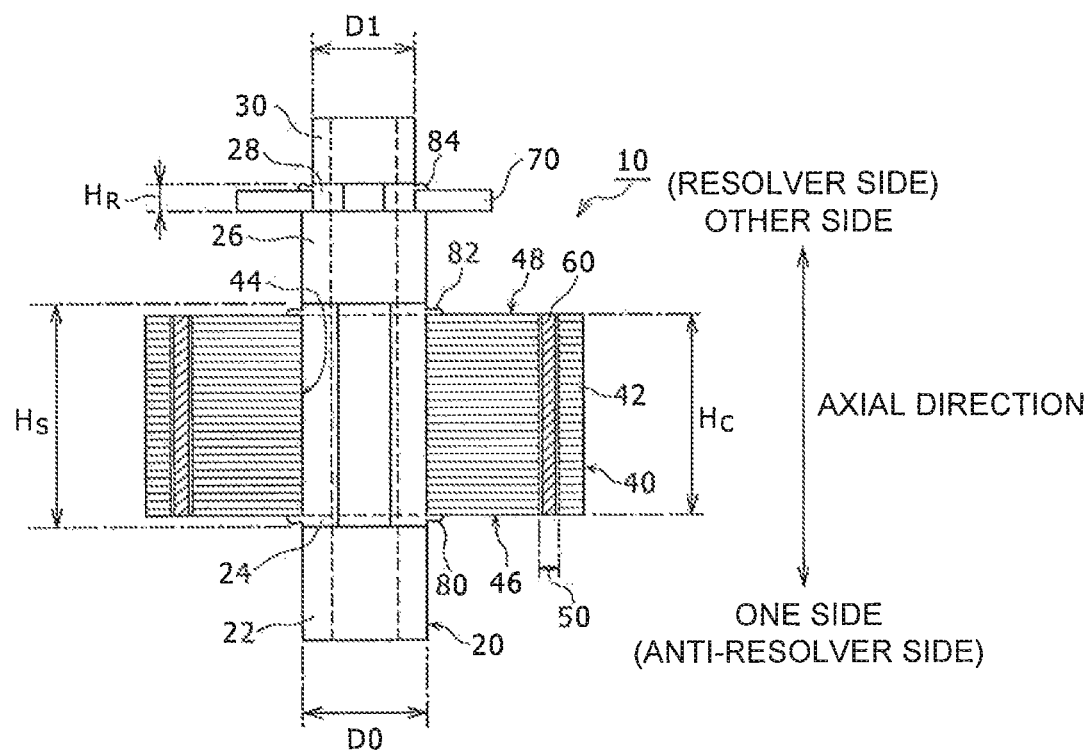
FIG. 1 is a cross-sectional view of a rotational electric machine rotor according to an embodiment.

FIG. 1 is a cross-sectional view illustrating the structure of a rotational electric machine rotor 10. Hereinafter, unless otherwise mentioned, the rotational electric machine rotor 10 is referred to as the rotor 10. A rotational electric machine including the rotor 10, such as a rotational electric machine mounted on a vehicle, is a motor generator configured to function as an electric motor when the vehicle accelerates, and function as a power generator when the vehicle brakes, and is a three-phase synchronization rotational electric machine. The rotational electric machine includes the rotor 10 illustrated in FIG. 1, and a circularly annular stator that is disposed on the outer peripheral side of the rotor 10 with a predetermined gap interposed therebetween and around which a winding wire coil is wound. FIG. 1 omits illustration of the stator.

The rotor 10 includes a rotor shaft 20, a rotor core 40, and a resolver 70 attached to the rotor shaft 20. FIG. 1 illustrates the axial direction of the rotor 10. When both sides in the axial direction are distinguished, a side at which the resolver 70 is attached is referred to as the other side or a resolver side, and a side opposite to the resolver side is referred to as one side or an anti-resolver side.

The rotor shaft 20 includes a through-hole along the axial direction, to which an output shaft (not illustrated) of the rotor 10 is fixed. The output shaft is a shaft, both ends of which in the axial direction are rotatably supported by bearings and that rotates cooperatively with the stator (not illustrated) when the rotor 10 is included in a rotational electric machine. Description of the through-hole of the rotor shaft 20 will be omitted below unless otherwise mentioned. The rotor shaft 20 includes, from the one side toward the other side in the axial direction, a circular shaft 22 having a diameter D0, an octagonal shaft 24 including a side circumscribed with a circle having the diameter D0, a circular shaft 26 having the diameter D0, an octagonal shaft 28 including a side circumscribed with a circle having a diameter D1, and a circular shaft 30 having the diameter D1. The octagonal shaft 24 has a length $H_S$ in the axial direction, and the octagonal shaft 28 has a length $H_R$ in the axial direction. The length $H_R$ is set to be larger than the thickness of the resolver 70 in the axial direction. The rotor shaft 20 may be a steel material fabricated in a predetermined shape.

The rotor core 40 is a stacked body in which a predetermined number of magnetic body thin plates 42 are stacked in the axial direction. The rotor core 40 includes a center hole 44 having an octagonal shape corresponding to an octagonal sectional outer shape of the octagonal shaft 24. The rotor core 40 includes a plurality of magnet through-holes 50, and a permanent magnet 60 inserted into the magnet through-holes 50 and fixed therein. In the rotor core 40, the stack of the magnetic body thin plates 42 has a length $H_C$ in the axial direction, which is set to be shorter than the length $H_S$ of the octagonal shaft 24 of the rotor shaft 20 in the axial direction.

Each magnetic body thin plate 42 is an electromagnetic steel plate as a kind of silicon steel plate. In the rotor core 40, the center hole 44 and the magnet through-holes 50 extend and penetrate in a direction parallel to the axial direction. In other words, the rotor core 40 is formed by stacking the predetermined number of magnetic body thin plates 42 while the center hole 44 and the magnet through-holes 50 are positioned to extend and penetrate in the axial direction, inserting the permanent magnet 60 into the penetrating magnet through-holes 50, and fixing the permanent magnet 60 therein.

The permanent magnets 60 are a plurality of magnets disposed at predetermined places on the outer peripheral side of the rotor core 40 to form magnetic poles of the rotor 10. The permanent magnets 60 generate torque cooperatively with a rotational magnetic field generated by performing predetermined energization to the winding wire coil wound around the stator (not illustrated) of the rotational electric machine, and accordingly, the rotor 10 rotates. Such a permanent magnet 60 is a rare-earth magnet such as a neodymium magnet containing neodymium, iron, and boron as primary components, or a samarium cobalt magnet containing samarium and cobalt as primary components. Alternatively, the permanent magnet 60 may be, for example, a ferrite magnet.

The resolver 70 is a rotation angle sensor used for operation control of the rotational electric machine, and includes one primary winding wire provided to the rotor shaft 20, and two secondary winding wires provided to the stator. The resolver 70 in FIG. 1 is part of the primary winding wire provided to the octagonal shaft 28 of the rotor shaft 20, and serves as a sensor component having a circularly annular outer shape including a center hole having an octagonal shape corresponding to an octagonal sectional outer shape of the octagonal shaft 28. The resolver 70 is aligned with the rotor shaft 20 in the axial direction by utilizing a step between the circular shaft 26 of the rotor shaft 20, which has the diameter D0, and the octagonal shaft 28 including a side circumscribed with a circle having the diameter D1. The resolver 70 provides rotation prevention on the rotor shaft 20 when the octagonal shaft 28 of the rotor shaft 20 is inserted into the octagonal center hole of the resolver 70.

The rotor shaft 20 and the rotor core 40 are fixed to each other by using protruding parts 80 and 82, and the rotor shaft 20 and the resolver 70 are fixed to each other by using a protruding part 84. Detailed contents of formation of the protruding parts 80, 82, and 84 and fixation by using the protruding parts 80, 82, and 84 will be described later.

Figure 2:
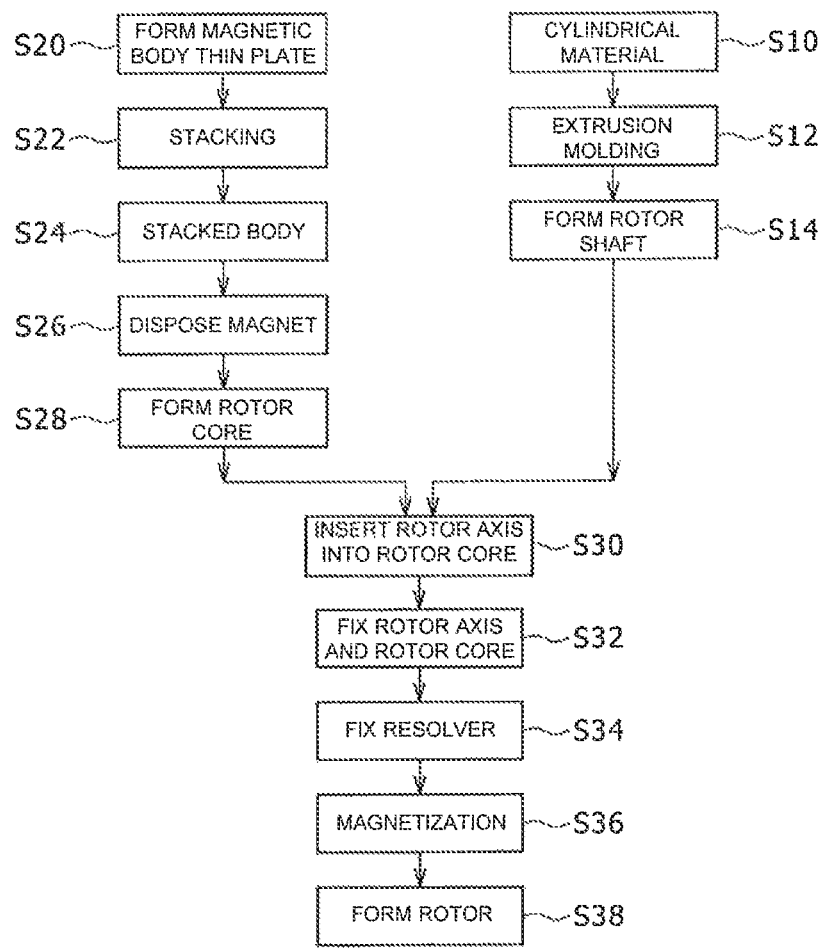
FIG. 2 is a flowchart illustrating the procedure of a method of manufacturing a rotational electric machine rotor according to the embodiment.

The following describes, with reference to FIGS. 2 to 13, procedures of a method of manufacturing the rotor 10 having the above-described configuration. FIG. 2 is a flowchart illustrating the procedure of the method of manufacturing the rotor 10, and FIGS. 3 to 13 are diagrams illustrating the contents of the procedures.

In FIG. 2, the procedures at S10 to S14 relate to formation of the rotor shaft 20, the procedures at S20 to S28 relate to formation of the rotor core 40, and S30 to S38 relate to the procedure of fixing the rotor shaft 20 and the rotor core 40 to each other to form the rotor 10.

Figure 3:
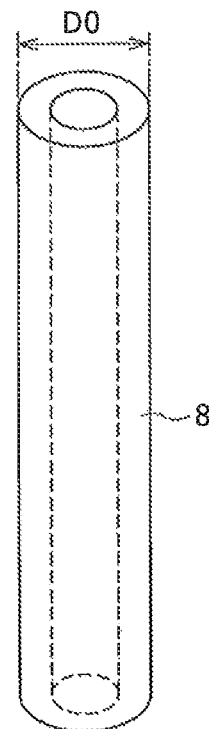
FIG. 3 is a perspective view of a cylindrical material at rotor shaft formation in FIG. 2.
Figure 4:
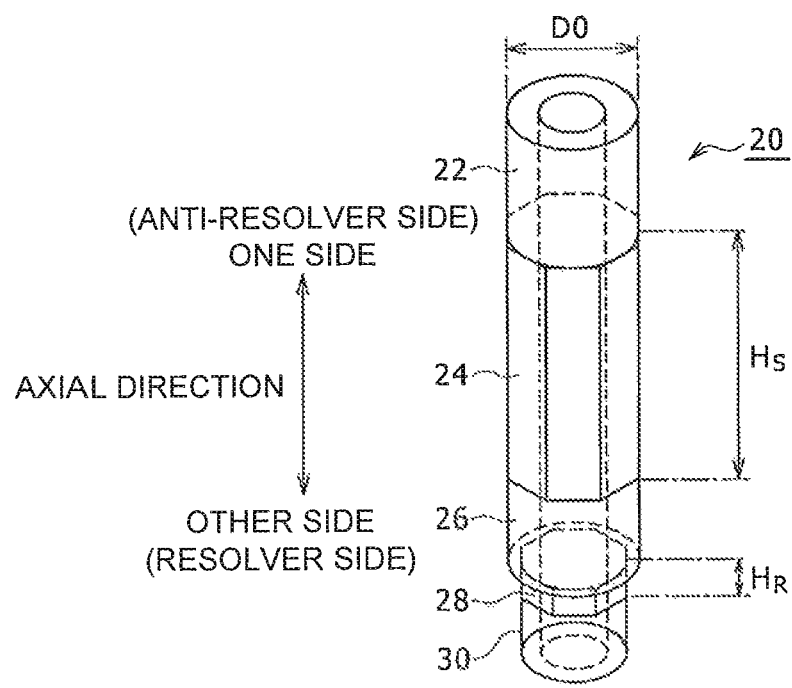
FIG. 4 is a perspective view of a rotor shaft obtained through a rotor shaft formation process in FIG. 2.

The formation of the rotor shaft 20 starts with preparation of a cylindrical material (S10). FIG. 3 is a perspective view of a cylindrical material 8. The cylindrical material 8 is a cylinder made of a steel material having an appropriate axial-direction length and the diameter D0 and including a through-hole. The cylindrical material 8 is subjected to predetermined extrusion forging (S12). The extrusion forging is a cold molding technique of molding the cylindrical material 8 under pressurization in the axial direction by using a cold forging mold that matches with the outer shape of the rotor shaft 20. When the forging mold has an inner shape larger than the diameter D0, the material is extruded to the inner shape, which is called side extrusion molding. FIG. 4 illustrates a shape obtained through the extrusion forging. This shape includes, from the one side toward the other side in the axial direction, the circular shaft 22 having the diameter D0, the octagonal shaft 24 including a side circumscribed with a circle having the diameter D0, the circular shaft 26 having the diameter D0, the octagonal shaft 28 including a side circumscribed with a circle having the diameter D1, and the circular shaft 30 having the diameter D1. This shape is the same as the outer shape of the rotor shaft 20 described with reference to FIG. 1. In this manner, the rotor shaft 20 is formed through the extrusion forging of the cylindrical material 8 (S14). Change of the inner diameter of the through-hole is prevented through cold forging by using, for example, an axis mold corresponding to the through-hole.

The octagonal shaft 24 has an octagonal sectional outer shape including a side circumscribed with a circle having the diameter D0 of the cylindrical material 8. The octagonal shape includes an apex part on the outer peripheral side of the circular shafts 22 and 26 having the diameter D0. Only the apex part of the octagonal shape is different between the diameter D0 of the cylindrical material 8 and the outer shape of the octagonal shape, and thus the octagonal shaft 24 can be formed with a smaller fabrication load as compared to large plastic deformation. The octagonal shaft 28 satisfies D1<D0 in comparison with the outer shape of the cylindrical material 8 having the diameter D0, but the length $H_R$ in the axial direction is significantly shorter than the length $H_S$ of the octagonal shaft 24 in the axial direction. Thus, a fabrication load when the octagonal shaft 24 and the octagonal shaft 28 are simultaneously shaped is substantially uniform in the axial direction.

The rotor shaft 20 has a significantly complicated shape including the circular shafts 22, 26, and 30 and the octagonal shafts 24 and 28, but is integrally shaped by cold extrusion forging. Accordingly, the material cost, the fabrication man-hours, and the like can be reduced as compared to a case in which the same outer shape is performed by another fabrication method such as machining fabrication.

Figure 5:
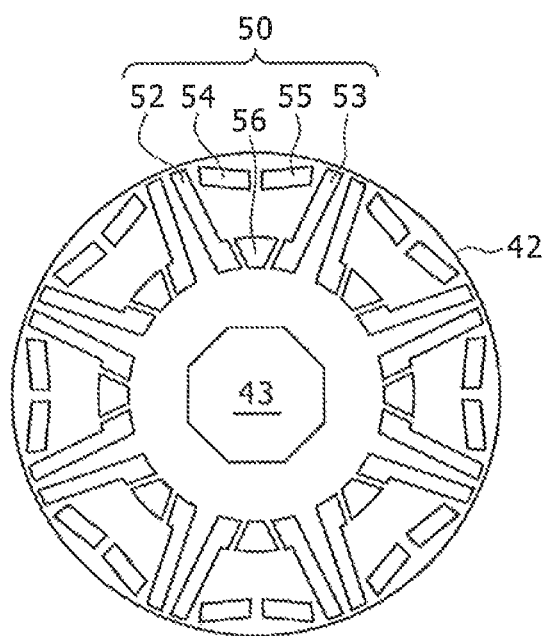
FIG. 5 is a top view of a magnetic body thin plate formed through a magnetic body thin plate formation process in FIG. 2.

The formation of the rotor core 40 proceeds separately from the formation of the rotor shaft 20. As shown in FIG. 2, the procedure of the formation of the rotor core 40 starts with formation of a magnetic body thin plate (S20). In the procedure, a magnetic body thin plate sheet is prepared, and the magnetic body thin plates 42 are formed by sequentially punching out the outer shapes of the center hole 44, the plurality of magnet through-holes 50, the rotor core 40, and the like described with reference to FIG. 1 by using a progressive press device. FIG. 5 is a plan view of each single magnetic body thin plate 42 subjected to the punching formation. The magnetic body thin plate 42 is an annular disk including an octagonal center hole 43, magnet through-holes 52, 53, 54, and 55, and a through-hole 56 for reducing magnetic flux leakage. The magnet through-holes 52, 53, 54, and 55 correspond to the plurality of magnet through-holes 50. The octagonal opening of the center hole 43 has a shape that is the same as the octagonal shape of the octagonal shaft 24 and is circumscribed with a circle having the diameter D0. As illustrated in FIG. 5, eight sets of the magnet through-holes 52, 53, 54, and 55 and the through-hole 56 are disposed in the circumferential direction of the magnetic body thin plate 42.

As illustrated in FIG. 2, after the plurality of magnetic body thin plates 42 are formed, a predetermined number of the magnetic body thin plates 42 are stacked (S22). The stacking is performed while the outer shape of each of the plurality of magnetic body thin plates 42 is positioned with the octagonal center hole 43, the magnet through-holes 52, 53, 54, and 55, and the through-hole 56. Through the stacking, the plurality of magnetic body thin plates 42 are formed into a stacked body (S24). The stacked body is in a state in which positioning is achieved between the predetermined number of magnetic body thin plates 42 but fixation is not achieved therebetween, and thus a predetermined outer shape hold jig or the like is used to prevent collapse of the stacked body.

After the stacked body is formed, permanent magnets 62, 63, 64, and 65 are inserted into the respective magnet through-holes 52, 53, 54, and 55 (S26), and the magnet through-holes 52, 53, 54, and 55 are filled with resin adhesive for fixing the permanent magnets 62, 63, 64, and 65. Thereafter, the resin adhesive is subjected to appropriate curing processing, and accordingly, the rotor core 40 described with reference to FIG. 1 is formed (S28). The permanent magnets 62, 63, 64, and 65 correspond to the plurality of permanent magnets 60.

Figure 6:
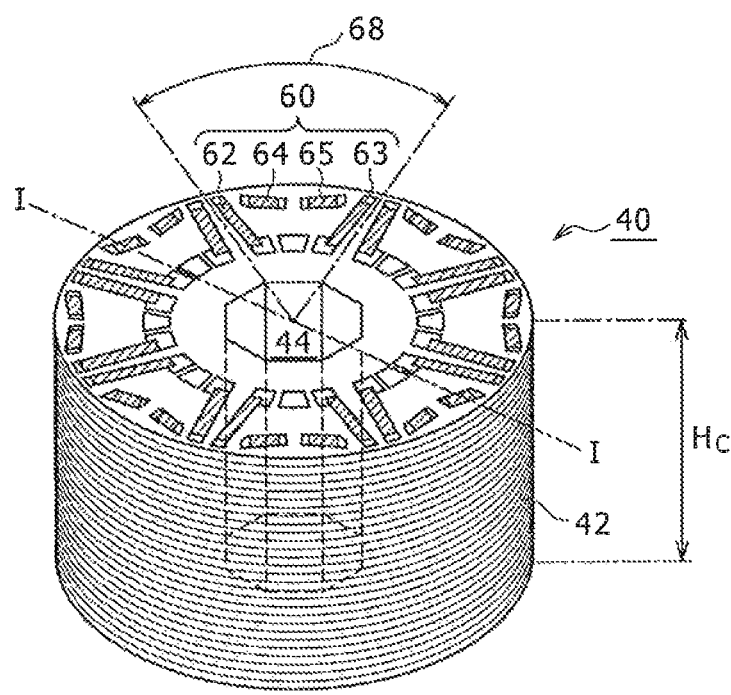
FIG. 6 is a perspective view illustrating a rotor core obtained through a rotor core formation process in FIG. 2.

FIG. 6 is a perspective view of the rotor core 40. The plurality of magnetic body thin plates 42 are stacked to a height equal to $H_C$ in the axial direction so that the rotor core 40 includes the octagonal center hole 44 penetrating in the axial direction. The permanent magnets 62, 63, 64, and 65 disposed in the respective magnet through-holes 52, 53, 54, and 55 form one magnetic pole 68 in the rotor 10. Since the eight sets of the magnet through-holes 52, 53, 54, and 55 are disposed in the circumferential direction, the number of magnetic poles in the rotor 10 is eight. The cross-sectional view of the rotor core 40 in FIG. 1 corresponds to a cross-sectional view taken along line I-I in FIG. 6. In the above description, for example, the number of magnetic poles, which is eight, and the disposition shape of the four permanent magnets 62, 63, 64, and 65 per magnetic pole, the magnet through-holes 52, 53, 54, and 55, and the through-hole 56 are exemplary for description, and the number of magnetic poles, the number of permanent magnets, and the disposition shape may be different from the examples.

Figure 7A:
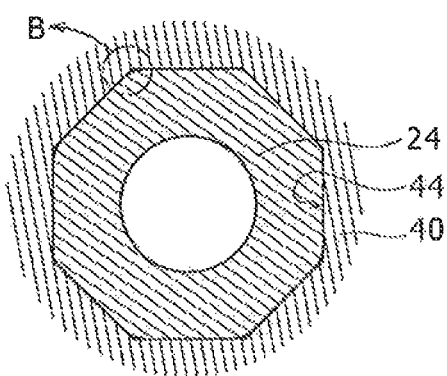
FIG. 7A is a cross-sectional view of a state in which the octagonal sectional outer shape of the rotor shaft is inserted into an octagonal center hole of the rotor core.

When the formation of the rotor shaft 20 (S14) and the formation of the rotor core 40 (S28) are completed, the rotor shaft 20 is inserted into the center hole 44 of the rotor core 40 (S30). The center hole 44 of the rotor core 40 is an opening hole having an octagonal sectional shape orthogonal to the axial direction, and the octagonal shaft 24 of the rotor shaft 20 is inserted into the octagonal center hole 44. FIG. 7A is a cross-sectional view of a state in which the octagonal shaft 24 of the rotor shaft 20 is inserted into the octagonal center hole 44 of the rotor core 40.

Figure 7B:
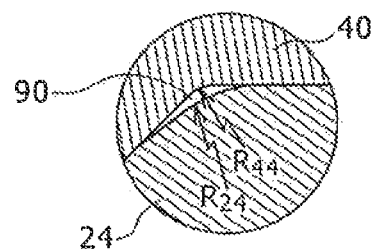
FIG. 7B is an enlarged view of an apex part of the octagon, which is denoted by B in FIG. 7A.

An octagon is an exemplary non-circular shape for preventing rotation of the rotor shaft 20 and the rotor core 40 relative to each other, and the rotation prevention is achieved at long sides of the octagon. To reliably achieve the rotation prevention, a smaller gap is preferably present between the octagonal center hole 44 of the rotor core 40 and the octagonal sectional outer shape of the octagonal shaft 24. In other words, the rotation prevention is preferably achieved by stop fitting, with which substantially no gap is present, or interference fitting, with which the octagonal sectional outer shape of the octagonal shaft 24 is slightly larger than the octagonal center hole 44 of the rotor core 40. In this example, the interference fit is applied, and the insertion at S30 is effectively insertion through fitting by pressing. In the insertion through fitting by pressing, the material of the rotor shaft 20 or the rotor core 40 plastically deforms to form burrs due to the stress of fitting by pressing. To reduce the stress of fitting by pressing and receive the material that flows through the plastic deformation, roundness is provided to the apex part of the octagonal shaft 24 and the corresponding apex part of the octagon of the center hole 44 of the rotor core 40 so that a gap 90 is formed as the difference between the curvature radii of the roundness. FIG. 7B is an enlarged view of an apex part of the octagon, which is denoted by B in FIG. 7A. When the curvature radius of roundness at the apex part of the octagonal shaft 24 is represented by $R_{24}$ and the curvature radius of roundness at the apex part of the center hole 44 of the rotor core 40 is represented by $R_{44}$, the gap 90 is formed by setting the curvature radii so that $R_{24} > R_{44}$ is satisfied.

When the octagonal shaft 24 of the rotor shaft 20 is inserted into the octagonal center hole 44 of the rotor core 40, end parts of the octagonal shaft 24 protrude out of an axial-direction end face 46 of the rotor core 40 on the one side and an axial-direction end face 48 thereof on the other side, respectively, due to the difference between the axial-direction lengths $H_S$ and $H_C$. The end part of the octagonal shaft 24 extending out of the axial-direction end face 46 of the rotor core 40 on the one side is denoted by 24a, and the end part of the octagonal shaft 24 extending out of the axial-direction end face 48 of the rotor core 40 on the other side is denoted by 24b. The fixation between the rotor shaft 20 and the rotor core 40 (S32) is performed by forming the protruding part 80 at the end part 24a and forming the protruding part 82 at the end part 24b.

Figure 8:
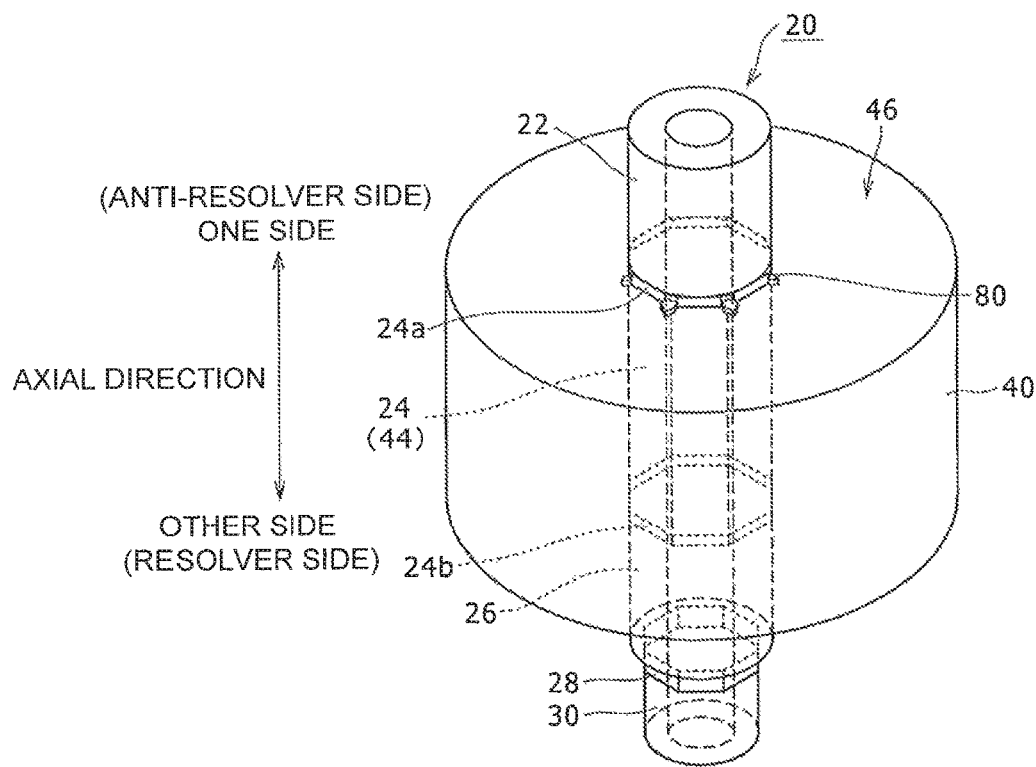
FIG. 8 is a perspective view of the state of fixation between the rotor shaft and the rotor core at an axial-direction end face on one side in a fixation process for the rotor shaft and the rotor core in FIG. 2.

FIG. 8 is a diagram illustrating the protruding part 80 formed at the end part 24a of the octagonal shaft 24. FIG. 8 omits illustration of the magnetic body thin plates 42 of the rotor core 40. The same is the case in FIGS. 11 and 12 to be described later.

The protruding part 80 is formed through a procedure as follows. First, the positions of the rotor core 40 and the rotor shaft 20 in the axial direction are set and held by using a hold jig (not illustrated) so that the end part 24a of the octagonal shaft 24 of the rotor shaft 20 protrudes by a predetermined length from the axial-direction end face 46 of the rotor core 40 on the one side. The predetermined length of the end part 24a is set experimentally or through simulation in advance based on specification of fixing force necessary between the rotor core 40 and the rotor shaft 20.

While the rotor core 40 and the rotor shaft 20 are held so that the end part 24a has the predetermined length, a predetermined swaging jig 100 is disposed relative to an apex part 24c of the octagon, at which the protruding part 80 is formed. The swaging jig 100 is a swaging punch that applies predetermined pressing force to a swaging place to fix two components by swaging. The following describes an example in which the axial-direction end face 46 of the rotor core 40 on the one side and the end part 24a of the octagonal shaft 24 of the rotor shaft 20 are fixed by swaging using the swaging jig 100. The swaging fixation is performed by squashing the apex part 24c of the octagon of the end part 24a of the octagonal shaft 24 toward the axial-direction end face 46 of the rotor core 40 on the one side. The protruding part 80 is formed by squashing the apex part 24c of the octagon, and the axial-direction end face 46 of the rotor core 40 on the one side and the end part 24a of the octagonal shaft 24 of the rotor shaft 20 are fixed to each other through the protruding part 80 by swaging.

Figure 9A:
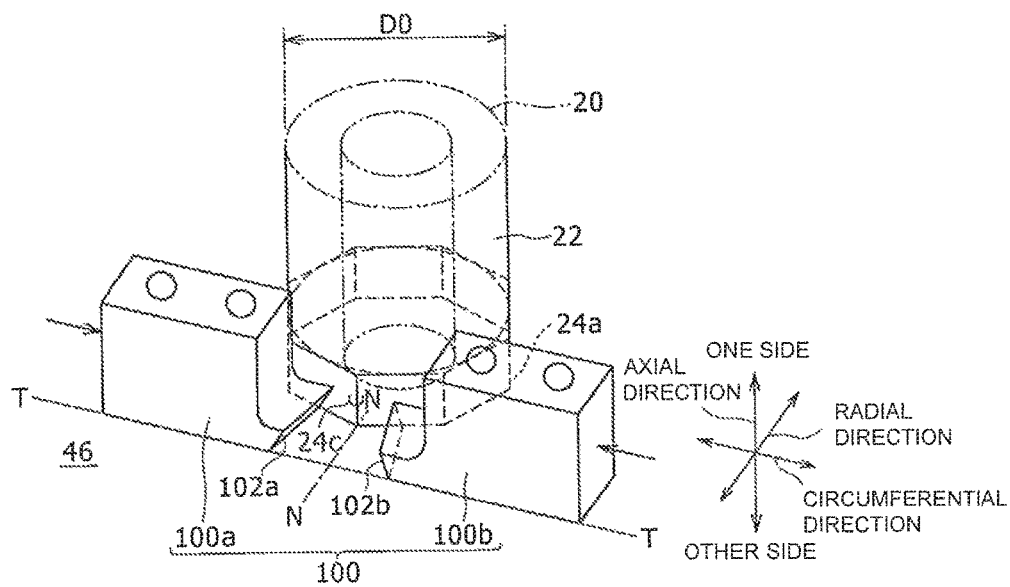
FIG. 9A is a perspective view illustrating a disposition relation between a predetermined swaging jig used in FIG. 8 and the rotor shaft.

FIG. 9A illustrates a disposition state of the swaging jig 100. The swaging jig 100 includes one pair of swaging jigs 100a and 100b disposed facing to each other. The pair of the swaging jigs 100a and 100b are disposed on a surface parallel to the axial-direction end face 46 of the rotor core 40 on the one side so that the apex part 24c of the octagon is sandwiched between the swaging jigs 100a and 100b on respective sides. FIG. 9A illustrates the disposition relation among the end part 24a extending out of the axial-direction end face 46 of the rotor core 40 on the one side, the circular shaft 22 on the one side thereof, and the pair of the swaging jigs 100a and 100b. The pair of the swaging jigs 100a and 100b are moved by a swaging drive device (not illustrated). The direction of the movement is parallel to the direction of line T-T tangent to the outer peripheral surface of a circle inscribed with the octagon, which corresponds to the apex part 24c. The outer peripheral surface of the circle inscribed with the octagon of the end part 24a is the outer peripheral surface of the circular shaft 22 of the rotor shaft 20. The pair of the swaging jigs 100a and 100b are set in such disposition that the swaging jigs 100a and 100b can press the apex part 24c of the octagon from both sides when moved on the surface parallel to the axial-direction end face 46 in directions illustrated with arrows parallel to the T-T direction so that the interval therebetween is reduced.

Figure 9B:
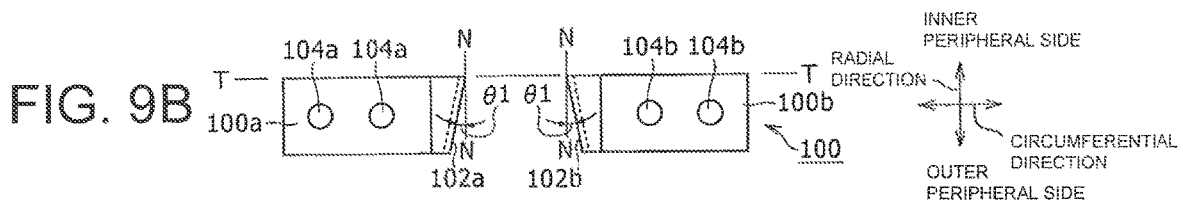
FIG. 9B is a top view of the swaging jig illustrated in FIG. 9A.
Figure 9C:
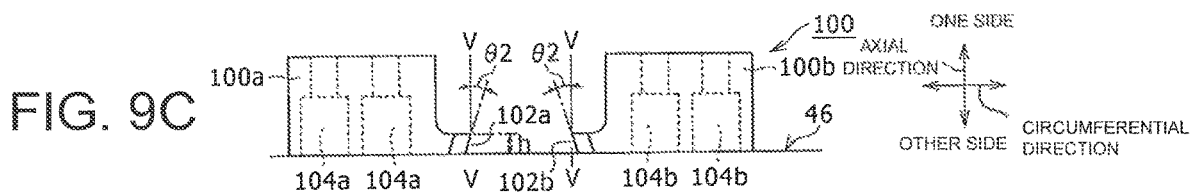
FIG. 9C is a side view of the swaging jig illustrated in FIG. 9A.
Figure 9D:
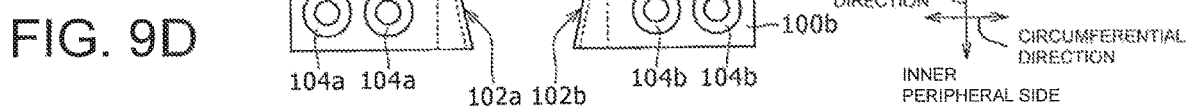
FIG. 9D is a bottom view of the swaging jig illustrated in FIG. 9A.

FIG. 9B is a top view in a three-plane diagram of the pair of the swaging jigs 100a and 100b. FIG. 9C is a side view in the three-plane diagram of the pair of the swaging jigs 100a and 100b. FIG. 9D is a bottom view in the three-plane diagram of the pair of the swaging jigs 100a and 100b. The swaging jigs 100a and 100b include swaging surfaces 102a and 102b, respectively, at leading end parts facing to each other. The swaging surfaces 102a and 102b are tool surfaces that squash the apex part of the octagon of the end part 24a in the axial direction. The swaging surfaces 102a and 102b are each tilted at a predetermined acute angle $\theta_1$ toward the outer peripheral side relative to an N-N direction normal to the outer peripheral surface of the circle inscribed with the octagon, which corresponds to the apex part 24c. FIG. 9B illustrates the acute angle $\theta_1$. The acute angle $\theta_1$ is tilted in directions in which the facing swaging surfaces 102a and 102b each increase the interval therebetween from the inner peripheral side toward the outer peripheral side. The predetermined acute angle $\theta_1$ is a tilt angle provided to facilitate flow of the material in the radial direction and the circumferential direction when the apex part 24c of the octagon at the end part 24a is squashed in the circumferential direction, and the magnitude of the angle is determined through experiment or simulation in advance. For example, the angle $\theta_1$ is preferably 0.5° to 5° approximately.

The swaging surfaces 102a and 102b are each tilted at a predetermined acute angle $\theta_2$ relative to a V-V direction orthogonal to the axial-direction end face 46 of the rotor core 40 on the one side. FIG. 9C illustrates the acute angle $\theta_2$. The acute angle $\theta_2$ is tilted in directions in which the facing swaging surfaces 102a and 102b each increase the interval therebetween from the one side toward the other side in the axial direction. In other words, the acute angle $\theta_2$ is tilted in directions in which the interval increases toward the axial-direction end face 46 of the rotor core 40 on the one side. The predetermined acute angle $\theta_2$ is provided so that, when the apex part 24c of the octagon at the end part 24a is squashed in the circumferential direction, the material spreads in the radial direction and the circumferential direction while being pressed toward the axial-direction end face 46 of the rotor core 40 on the one side, thereby forming the protruding part 80. In other words, the protruding part 80 is formed while being pressed toward the axial-direction end face 46 of the rotor core 40 on the one side, and accordingly, the axial-direction end face 46 of the rotor core 40 on the one side and the rotor shaft 20 are connected with each other through the protruding part 80 by swaging. The magnitude of the predetermined acute angle $\theta_2$ is determined through experiment or simulation in advance based on specification of the strength of swaging connection and the like. For example, the angle $\theta_2$ is preferably 0.5° to 5° approximately.

A height dimension h of the swaging surfaces 102a and 102b of the swaging jigs 100a and 100b in the axial direction is set to be shorter than the height dimension of the end part 24a in the axial direction. In the example illustrated in FIG. 9A, the height dimension h of the swaging surfaces 102a and 102b is about half of the height dimension of the end part 24a in the axial direction. This relation is merely exemplary for description, and is changed as appropriate based on specification of the protruding part 80 formed and the like. Holes 104a and 104b in FIGS. 9B, 9C, and 9D are attachment holes used to attach the swaging jigs 100a and 100b to the swaging drive device (not illustrated).

Figure 10A:
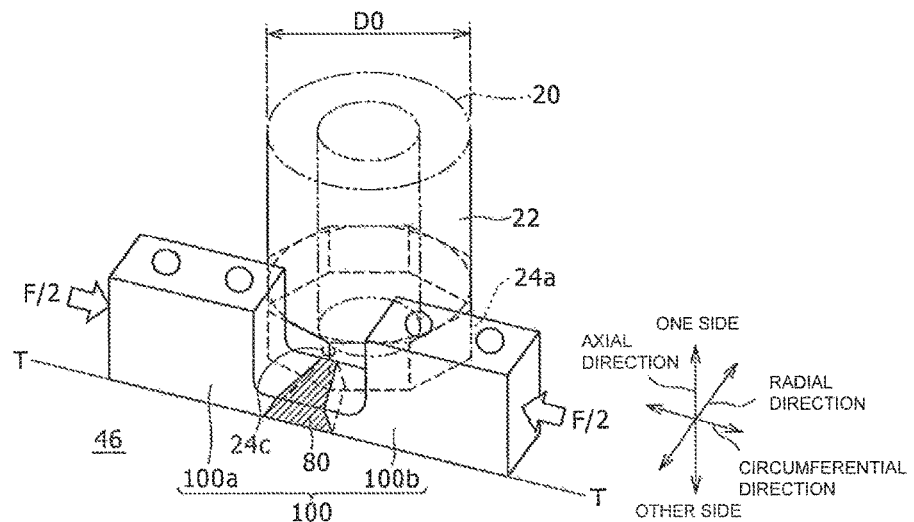
FIG. 10A is a perspective view illustrating a state in which pressing force in the circumferential direction is applied to the swaging jig in the state illustrated in FIG. 9A to squash the rotor shaft so that the rotor shaft is expanded outward beyond the outer periphery thereof along the axial-direction end face of the rotor core to form a protruding part.
Figure 10B:
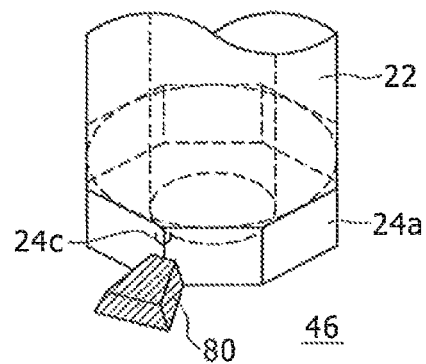
FIG. 10B is a diagram illustrating the protruding part in FIG. 10A.

The pair of the swaging jigs 100a and 100b are moved on the surface parallel to the axial-direction end face 46 in directions illustrated with arrows parallel to the T-T direction, thereby reducing the interval between the swaging surfaces 102a and 102b. Then, when the swaging surfaces 102a and 102b reach both sides of the apex part 24c of the octagon at the end part 24a, pressing forces (F/2) in the circumferential direction are applied to the swaging jigs 100a and 100b, respectively, in facing directions. FIG. 10A is a diagram illustrating the relation between the swaging jigs 100a and 100b and the rotor shaft 20 in this case. The end part 24a plastically deforms when the apex part 24c of the octagon at the end part 24a receives the pressing forces (F/2) in the facing directions from the swaging surfaces 102a and 102b on both sides in the circumferential direction. The plastic deformation squashes the end part 24a of the rotor shaft 20 in the axial direction and spreads the end part 24a outward beyond the apex part 24c of the octagon at the end part 24a along the axial-direction end face 46 of the rotor core 40 on the one side, thereby forming the protruding part 80. FIG. 10B is a diagram illustrating the protruding part 80 formed in FIG. 10A.

In the above description, the protruding part 80 is formed at the single apex part 24c of the octagon of the end part 24a, but the protruding part 80 is formed at each of the other apex parts 24c of the end part 24a in a similar manner. Specifically, the rotor shaft 20 is inserted into the octagonal center hole of the rotor core 40, and the rotor shaft 20 extending out of the axial-direction end face 46 of the rotor core 40 on the one side is squashed by using the predetermined swaging jigs 100a and 100b. Then, the rotor shaft 20 is expanded outward beyond the outer periphery of the octagonal section along the axial-direction end face 46 of the rotor core 40 on the one side, thereby forming the protruding part 80 for fixing the axial-direction end face 46 of the rotor core 40 on the one side and the rotor shaft 20 to each other.

In this manner, as illustrated in FIG. 8, the rotor shaft 20 and the rotor core 40 are fixed to each other on the axial-direction end face 46 of the rotor core 40 on the one side through the protruding parts 80. In FIG. 8, the protruding part 80 is formed at each of the eight apex parts of the octagon of the end part 24a, which is merely exemplary for description. The number of protruding parts 80 is changed as appropriate in accordance with the size of each protruding part 80 and the fixing force. The number of protruding parts 80 is preferably three or more for reliable application of the fixing force between the rotor shaft 20 and the rotor core 40 on the axial-direction end face 46.

Figure 11:
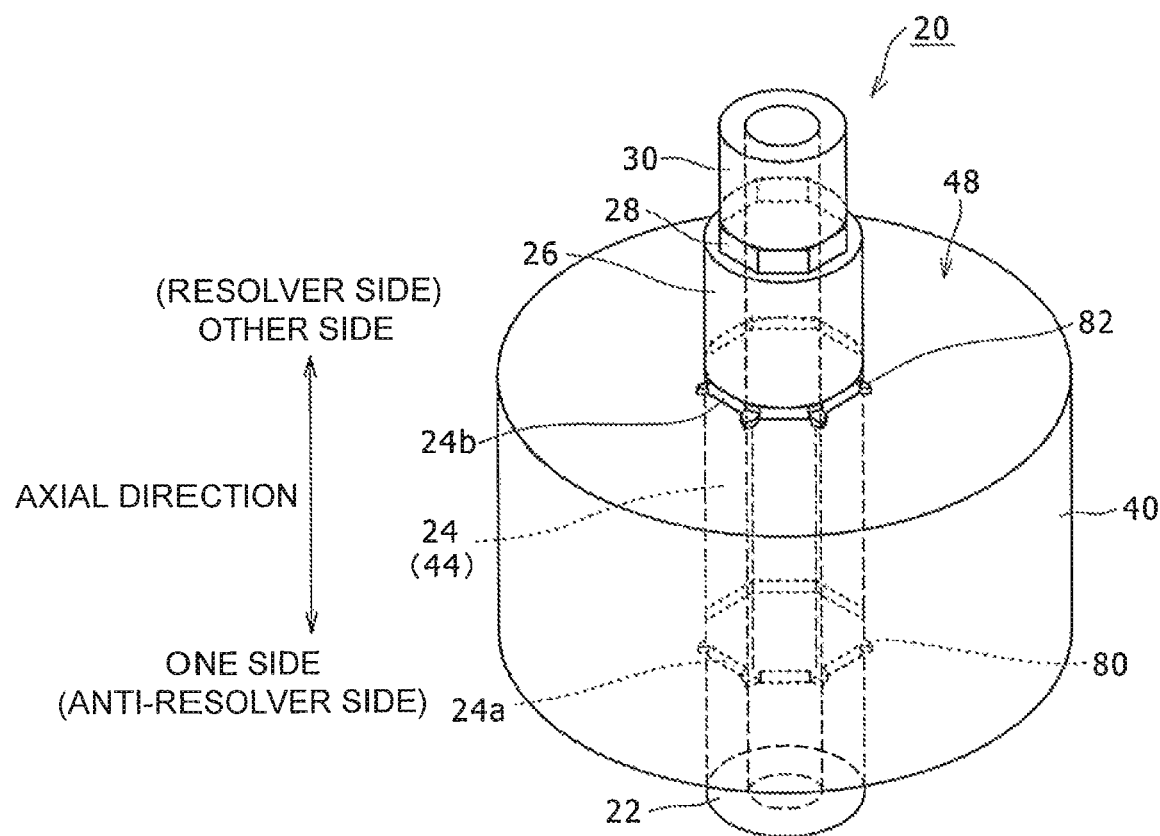
FIG. 11 is a perspective view of the state of fixation between the rotor shaft and the rotor core at an axial-direction end face on the other side in the state illustrated in FIG. 8.

FIG. 11 is a diagram illustrating the protruding part 82 formed at the end part 24b of the octagonal shaft 24 extending out of the axial-direction end face 48 of the rotor core 40 on the other side. Since the rotor shaft 20 and the rotor core 40 are already fixed to each other on the axial-direction end face 46 of the rotor core 40 on the one side through the protruding parts 80, the axial direction is inverted so that the axial-direction end face 48 of the rotor core 40 on the other side is disposed on the upper side. The protruding part 82 may be formed in a manner similar to the procedure described with reference to FIG. 8. Specifically, the rotor shaft 20 extending out of the axial-direction end face 48 of the rotor core 40 on the other side is squashed by using the predetermined swaging jigs 100a and 100b. Then, the rotor shaft 20 is expanded outward beyond the outer periphery of the octagonal section of the rotor shaft 20 along the axial-direction end face 48 of the rotor core 40 on the other side, thereby forming the protruding part 82 for fixing the axial-direction end face 48 of the rotor core 40 on the other side and the rotor shaft 20 to each other.

The rotor core 40 is fixed to the rotor shaft 20 at both axial-direction end faces through the protruding parts 82 formed in this manner and the protruding parts 80 described with reference to FIG. 8. Accordingly, the stacked body including the plurality of magnetic body thin plates 42 is fixed and integrated through the protruding parts 80 and 82.

As illustrated in FIG. 2, after the fixation between the rotor shaft 20 and the rotor core 40 is completed, the resolver 70 is fixed to the rotor shaft 20 (S34). The fixation of the resolver 70 to the rotor shaft 20 is achieved as follows. First, the rotor shaft 20 and the rotor core 40 fixed to each other through the protruding parts 80 and 82 are held by using the appropriate hold jig used in FIG. 11. Subsequently, the octagonal shaft 28 of the rotor shaft 20 is inserted into the octagonal center hole of the resolver 70. The relation between each apex part of the octagonal center hole of the resolver 70 and the corresponding apex part of the octagonal shaft 28 of the rotor shaft 20 is the same as that described with reference to FIGS. 7A and 7B, and the insertion is achieved through fitting by pressing similarly to the fixation of the rotor shaft 20 and the rotor core 40, and thus detailed description thereof will be omitted. The length $H_R$ of the octagonal shaft 28 of the rotor shaft 20 in the axial direction is set to be larger than the thickness of the resolver 70 so that an end part 28b of the octagonal shaft 28 of the rotor shaft 20 protrudes out of an upper surface 72 of the resolver 70 in accordance with the set length.

Figure 12:
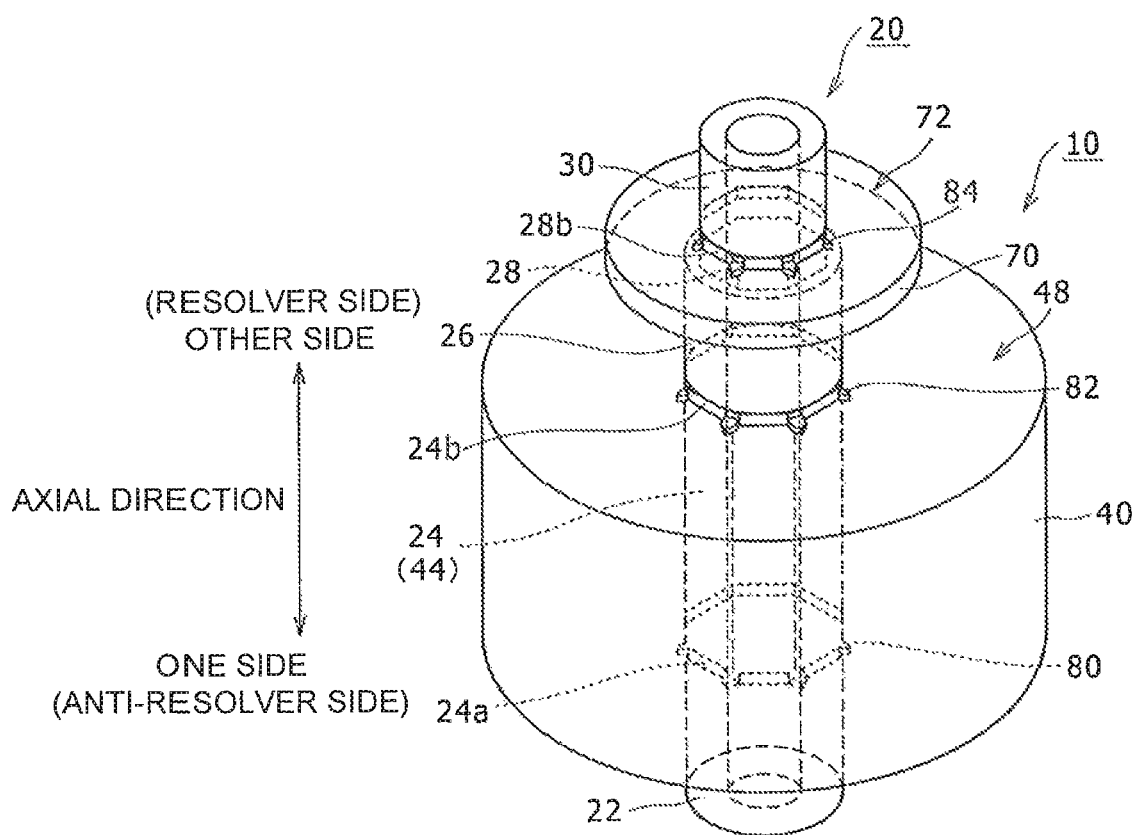
FIG. 12 is a perspective view of the state of fixation between the rotor shaft and a resolver in a resolver fixation process in FIG. 2.

Subsequently, the apex part of the end part 28b is plastically deformed by using a predetermined pair of resolver swaging jigs to form the protruding part 84 on the upper surface 72 of the resolver 70. The predetermined pair of resolver swaging jigs are substantially the same as the swaging jigs 100a and 100b used for the formation of the protruding parts 80 and 82, but the height dimension h of the swaging surfaces 102a and 102b is changed as needed in accordance with the height of the end part 28b in the axial direction. When predetermined pressing forces (F'/2) are applied to the pair of resolver swaging jigs, respectively, the apex part of the end part 28b plastically deforms to form the protruding part 84 on the upper surface 72 of the resolver 70. The resolver 70 is fixed to the rotor shaft 20 through the protruding part 84. FIG. 12 is a diagram illustrating a state in which the resolver 70 is fixed to the rotor shaft 20 through the protruding parts 84.

As illustrated in FIG. 2, after the fixation of the resolver 70 to the rotor shaft 20 is completed, the permanent magnets 60 are magnetized (S36). This magnetization is performed after the permanent magnets 60 are disposed in the magnet through-holes 50 of the rotor core 40, and is processing called post magnetization. The post magnetization processing may be performed by a publicly known post magnetization method. In the magnetization processing, the phase relation between each magnetic pole 68 of the rotor core 40 and a primary coil of the resolver 70 is adjusted. In this magnetization phase adjustment, the vertical disposition relation of the resolver 70 relative to the rotor core 40 may be inverted with respect to that in FIG. 12 as needed by a magnetized jig and the like so that the resolver 70 is disposed below the rotor core 40. When the magnetization processing is completed, all processing related to the formation of the rotor 10 is completed (S38).

Figure 13:
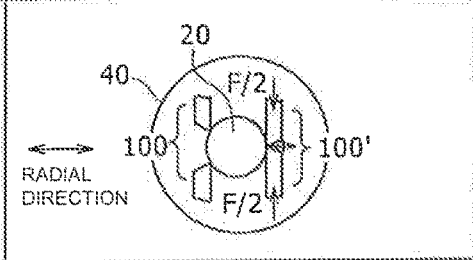
FIG. 13 is a diagram illustrating four cases of the relation between pressing force of the swaging jig and extrusion of an apex part of a non-circular section of the rotor shaft.

In the above-described formation of the protruding parts 80, 82, and 84, the direction of the pressing force F is aligned with the circumferential direction, and the direction of material extrusion at the octagonal shafts 24 and 28 is aligned with the radial direction and the circumferential direction. This arrangement is merely exemplary for description. The direction of the pressing force F may be aligned with the radial direction and the circumferential direction in addition to the axial direction, and the direction of material extrusion may be the axial direction and the radial direction. FIG. 13 includes diagrams illustrating four methods of forming the protruding parts 80, 82, and 84. Each diagram illustrates at least one of a cross-sectional view of the rotor shaft 20 and the rotor core 40 when viewed in parallel to the axial direction and a cross-sectional view of the rotor shaft 20 and the rotor core 40 when viewed in orthogonal to the axial direction. The swaging jig is denoted by 100 before the pressing force F is applied, and the swaging jig while the pressing force F is applied is denoted by 100'. In each diagram, the swaging jig 100 is illustrated on the left side, and the swaging jig 100' is illustrated on the right side.

In a first method, the direction of the pressing force F is aligned with the circumferential direction, and the direction of material extrusion is aligned with the radial direction and the circumferential direction. The first method is the same as a method used in the formation of the protruding parts 80, 82, and 84, which is described with reference to FIGS. 8 to 12. In the first method, there is no constraint in the axial direction and thus no restriction on the length of end parts of each octagonal shaft. Accordingly, the rotor shaft 20 can omit the circular shaft and have an octagonal shape across the total length in the axial direction.

In a second method, the direction of the pressing force F is aligned with the radial direction, and the direction of material extrusion is aligned with the radial direction and the circumferential direction. In the second method, as in the first method, there is no constraint in the axial direction and thus no restriction on the length of end parts of each octagonal shaft. Accordingly, the rotor shaft 20 can omit the circular shaft and have an octagonal shape across the total length in the axial direction.

In a third method, the direction of the pressing force F is aligned with the radial direction, a primary direction of material extrusion is aligned with the axial direction, and a secondary direction of material extrusion is aligned with the radial direction and the circumferential direction. In the third method, as in the first method and the second method, there is no constraint in the axial direction and thus no restriction on the length of end parts of each octagonal shaft. Accordingly, the rotor shaft 20 can omit the circular shaft and have an octagonal shape across the total length in the axial direction.

In a fourth method, the direction of the pressing force F is aligned with the axial direction, the primary direction of material extrusion is aligned with the axial direction, and the secondary direction of material extrusion is aligned with the radial direction and the circumferential direction. In the fourth method, there is restriction on the length of end parts of each octagonal shaft.

In FIGS. 8 to 12 described above, the protruding parts 80 are formed at the axial-direction end face 46 of the rotor core 40 on the one side, and subsequently, the protruding parts 82 are formed at the axial-direction end face 48 of the rotor core 40 on the other side, and thereafter, the protruding parts 84 for fixing the resolver 70 are formed. Instead, a swaging device including a plurality of swaging jigs may be used to simultaneously form the protruding parts 80 and the protruding parts 82, and if possible, a swaging jig capable of simultaneously forming the protruding parts 80, 82, and 84 may be used.

Figure 14:
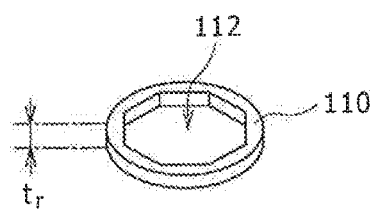
FIG. 14 is a perspective view of a metal ring used in another embodiment.
Figure 15:
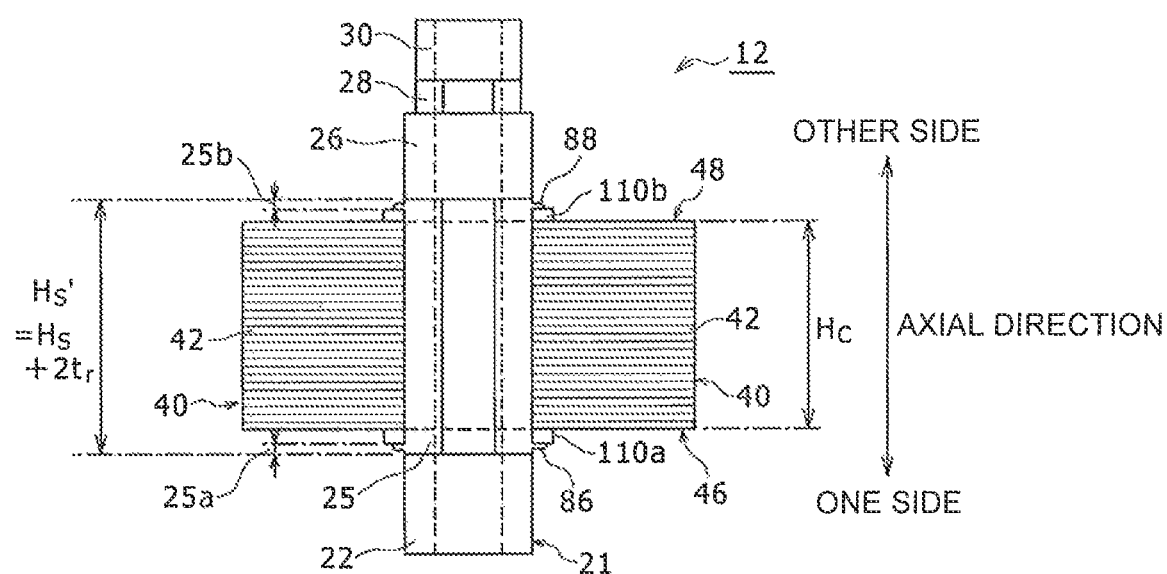
FIG. 15 is a cross-sectional view of a rotational electric machine rotor including the metal ring illustrated in FIG. 14.
Figure 16:
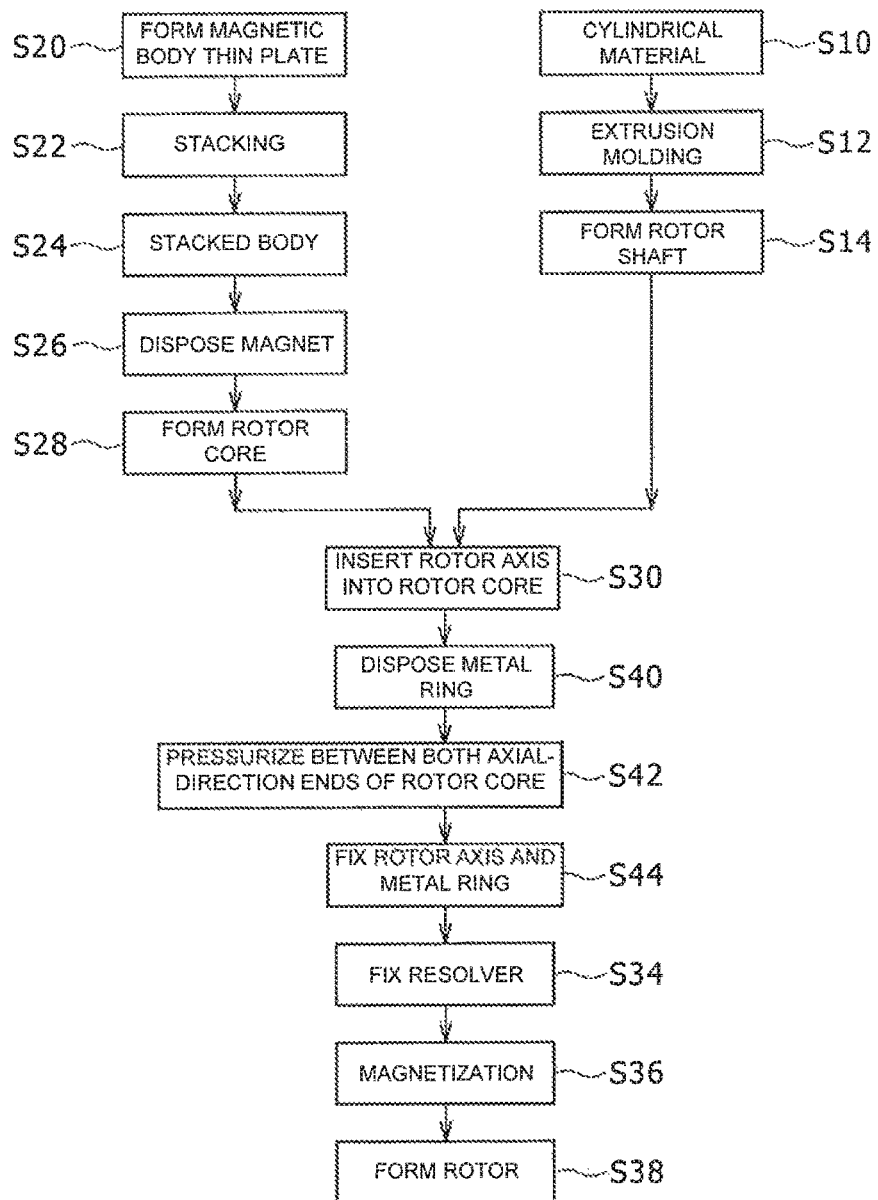
FIG. 16 is a flowchart illustrating the procedure of a method of manufacturing the rotational electric machine rotor illustrated in FIG. 15.

In the above description, the rotor shaft 20 and the rotor core 40 are fixed to each other by directly performing the swaging processing between each of the end parts 24a, 24b, and 28b of the octagonal shafts 24 and 28 of the rotor shaft 20 and the corresponding one of the axial-direction end face 46 of the rotor core 40 on the one side and the axial-direction end face 48 thereof on the other side. Instead, a metal ring applicable to the swaging processing may be used, and the swaging processing may be performed between the metal ring and the rotor shaft 20 to fix the rotor shaft 20 and the rotor core 40 to each other through the metal ring. FIGS. 14 to 16 are each a diagram illustrating a method of manufacturing a rotor 12 in which the rotor shaft 20 and the rotor core 40 are fixed to each other by using the metal ring applicable to the swaging processing.

FIG. 14 is a perspective view of a metal ring 110 used in the rotor 12. The metal ring 110 has a circularly annular outer shape including a center hole 112 having an octagonal shape corresponding to octagonal sectional outer shape of an octagonal shaft 25 of the rotor shaft 20 to be described later. The metal ring 110 has a thickness $t_r$. The metal ring 110 is obtained by shaping a metallic material applicable to the swaging processing of the rotor shaft 20 into a predetermined shape. The metallic material may be a steel material the same as that of the rotor shaft 20.

FIG. 15 is a cross-sectional view of the rotor 12 using the metal ring 110. The rotor 12 includes a rotor shaft 21, the rotor core 40, and the resolver 70 attached to the rotor shaft 21. FIG. 15 omits illustration of the resolver 70. The rotor shaft 21 has a configuration substantially the same as that of the rotor shaft 20 described with reference to FIG. 4 except that the octagonal shaft 24 of the rotor shaft 20 is replaced with the octagonal shaft 25. The metal ring 110 is disposed on each of the one side and the other side of the octagonal shaft 25 in the axial direction. When the two metal rings 110 are distinguished, the metal ring disposed on the one side of the octagonal shaft 25 in the axial direction is denoted by 110a, and the metal ring disposed on the other side of the octagonal shaft 25 in the axial direction is denoted by 110b.

Although the octagonal shaft 24 of the rotor shaft 20 has the length $H_S$ in the axial direction, the octagonal shaft 25 of the rotor shaft 21 has a length $H_S'$ in the axial direction. The length $H_S'$ is longer than the length $H_S$ by a thickness $2t_r$ as the sum of the thickness $t_r$ of the metal ring 110a and the thickness $t_r$ of the metal ring 110b. In other words, the length $H_S'$ is set to be $H_S+2t_r$.

Through this setting, an end part 25a extending out of the metal ring 110a on the one side of the octagonal shaft 25 in the axial direction has an axial-direction length the same as that of the end part 24a of the rotor shaft 20. Similarly, an end part 25b extending out of the metal ring 110b on the other side of the octagonal shaft 25 in the axial direction has an axial-direction length the same as that of the end part 24b of the rotor shaft 20. Thus, the pair of the swaging jigs 100a and 100b used to form the protruding parts 80 and 82 in the rotor shaft 20 can be used to form a protruding part 86 at the end part 25a and form a protruding part 88 at the end part 25b.

The protruding parts 86 and 88 sandwich both end faces of the rotor core 40 through the metal rings 110a and 110b, and accordingly, indirectly fix the rotor shaft 21 and the rotor core 40. The axial force of this fixation in the rotor 12 is expected to be smaller than the axial force of the rotor 10 in which the rotor shaft 20 and the rotor core 40 are directly fixed to each other through the protruding parts 80 and 82. To avoid this, when the protruding parts 86 and 88 are formed, a predetermined pressure is applied between the axial-direction end face 46 of the rotor core 40 on the one side and the axial-direction end face 48 on the other side to reduce a gap between the plurality of magnetic body thin plates 42 and the like so that $H_S'$ is correctly set to be $H_S+2t_r$.

FIG. 16 is a flowchart illustrating the procedure of a method of manufacturing the rotor 12 illustrated in FIG. 15. FIG. 16 differs from FIG. 2, which is a flowchart illustrating the procedure of the method of manufacturing the rotor 10, in that three processing procedures are performed between the processing procedure of inserting the rotor shaft 20 into the rotor core 40 (S30) and the processing procedure of resolver fixation (S34). The other processing procedures have contents the same as those of the processing procedures in FIG. 2, and thus detailed description thereof will be omitted.

In the method of manufacturing the rotor 12, after the rotor shaft 21 is inserted into the rotor core 40 (S30), the metal rings 110*a* and 110*b* are disposed (S40). The metal ring 110*a* is disposed on the one side of the octagonal shaft 25 of the rotor shaft 21 in the axial direction, and the metal ring 110*b* is disposed on the other side of the octagonal shaft 25 in the axial direction. The disposition is performed by inserting one end side and the other end side of the octagonal shaft 25 of the rotor shaft 21 into the metal rings 110*a* and 110*b*. The insertion is performed through fitting by pressing. Subsequently, a pressure is applied between both axial-direction ends of the rotor core 40 (S42). Through the pressure application, a gap between the plurality of magnetic body thin plates 42 and the like can be reduced so that the relation between the length $H_S'$ of the octagonal shaft 25 in the axial direction and the length $H_S$ of the octagonal shaft 25 of the rotor 10 in FIG. 1 in the axial direction accurately satisfies $H_S'=(H_S+2t_r)$. In this state, the protruding parts 86 and 88 are formed between the rotor shaft 21 and the respective metal rings 110*a* and 110*b* to fix the rotor shaft 21 to each of the metal rings 110*a* and 110*b* (S44). The protruding parts 86 and 88 sandwich both end faces of the rotor core 40 through the metal rings 110*a* and 110*b*, and accordingly, the rotor shaft 21 and the rotor core 40 are indirectly fixed to each other. Processing procedures after S44 are the same as those in FIG. 2.

Figure 17A:
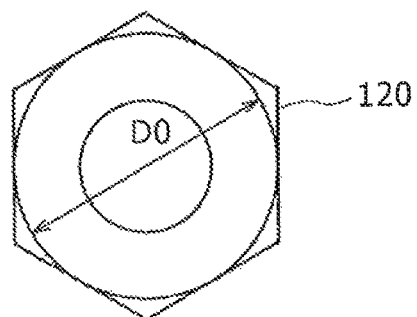
FIG. 17A is a diagram illustrating a hexagonal section as another exemplary non-circular shape used in a rotational electric machine rotor according to the embodiment.
Figure 17B:
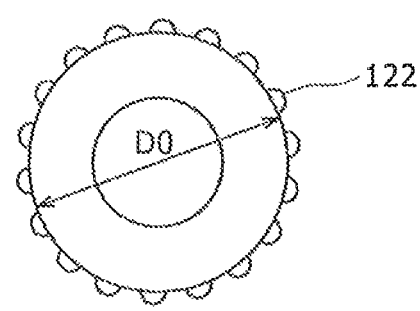
FIG. 17B is a diagram illustrating, as another exemplary non-circular shape used in the rotational electric machine rotor according to the embodiment, a serration section having irregularities in a gear teeth shape on the outer peripheral surface thereof.
Figure 17C:
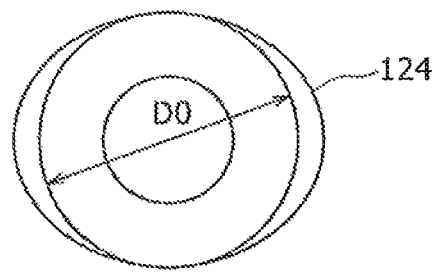
FIG. 17C is a diagram illustrating a substantially elliptical section as another exemplary non-circular shape used in the rotational electric machine rotor according to the embodiment.

In the above description, the rotor shaft 20 includes the octagonal shaft 24, and the rotor core 40 includes the center hole 44 as an opening having an octagonal shape corresponding to the octagonal sectional outer shape of the octagonal shaft 24. This configuration is merely exemplary for description of means for preventing rotation of the rotor shaft 20 and the rotor core 40 relative to each other. Instead of octagonal shapes, the rotor shaft 20 may have a non-circular sectional outer shape, and the rotor core 40 may include a non-circular center hole. FIGS. 17A, 17B, and 17C are diagrams illustrating three exemplary non-circular shapes, other than octagonal shapes, circumscribed with a circle having the diameter D0.

FIG. 17A is a diagram illustrating a hexagon 120 as an exemplary polygon other than an octagon. FIG. 17B is a diagram illustrating a serration 122 having irregularities in a gear teeth shape on the outer peripheral surface of a circle having the diameter D0. FIG. 17C is a diagram illustrating a substantially elliptical shape 124.

In the above description, the protruding parts 82, 84, 86, and 88 are each formed at an apex part of an octagon. An apex part of an octagon is located on the outer peripheral side of a circle inscribed with the octagon. For example, the protruding parts 82 and 84 are formed on the outer peripheral side of the circular shafts 22 and 26 having the diameter D0. In other words, in the rotor shaft 20 having an octagonal outer shape, positions at which the protruding parts 82 and 84 are formed each include a position farthest from the barycenter position of the section of the rotor shaft 20. Similarly, in a rotor shaft having a non-circular sectional outer shape other than an octagon, a position at which a protruding part is formed includes a position farthest from the barycenter position of a non-circular section of a rotor shaft. In the hexagon 120 illustrated in FIG. 17A, a position farthest from the barycenter position of a hexagonal section is at an apex part of the hexagon 120, and thus a protruding part is formed to include the apex part of the hexagon 120. In the serration 122 illustrated in FIG. 17B, a position farthest from the barycenter position of a serration section is at each leading end of irregularities in a teeth shape, and thus a protruding part is formed to include the leading end of the irregularities in a teeth shape. In the substantially elliptical shape 124 illustrated in FIG. 17C, a position farthest from the barycenter position of a substantially elliptical shape section is at each intersection point between the long axis of a substantial ellipse and an arc of the substantial ellipse, and thus a protruding part is formed to include the intersection point.

In the above description, the rotor core 40 is of an embedded magnet type in which the permanent magnets 60 are disposed in the plurality of respective magnet through-holes 50 disposed in the circumferential direction. Instead, the rotor core 40 may be of a bonded magnet type in which the plurality of permanent magnets 60 are bonded along the outer peripheral surface of the rotor core 40. Alternatively, the rotor core 40 may be of an anisotropic reluctance type in which each magnetic body thin plate 42 is provided with a plurality of slots to form anisotropy of magnetoresistance without using permanent magnets.

Figure 18:
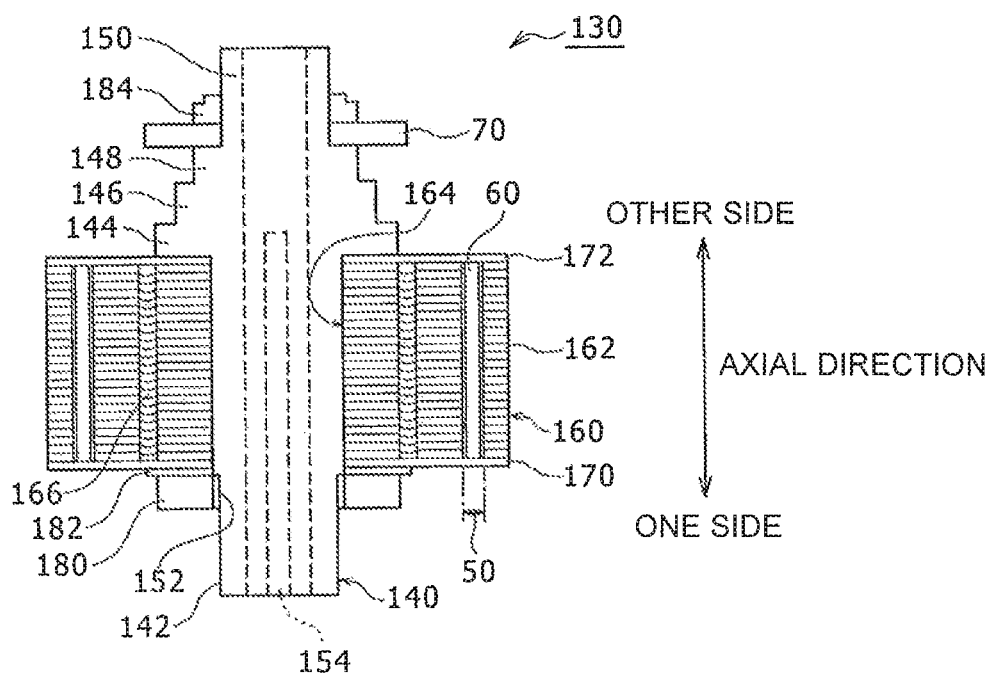
FIG. 18 is a diagram illustrating a section of a rotational electric machine rotor according to a conventional technology.
Figure 19:
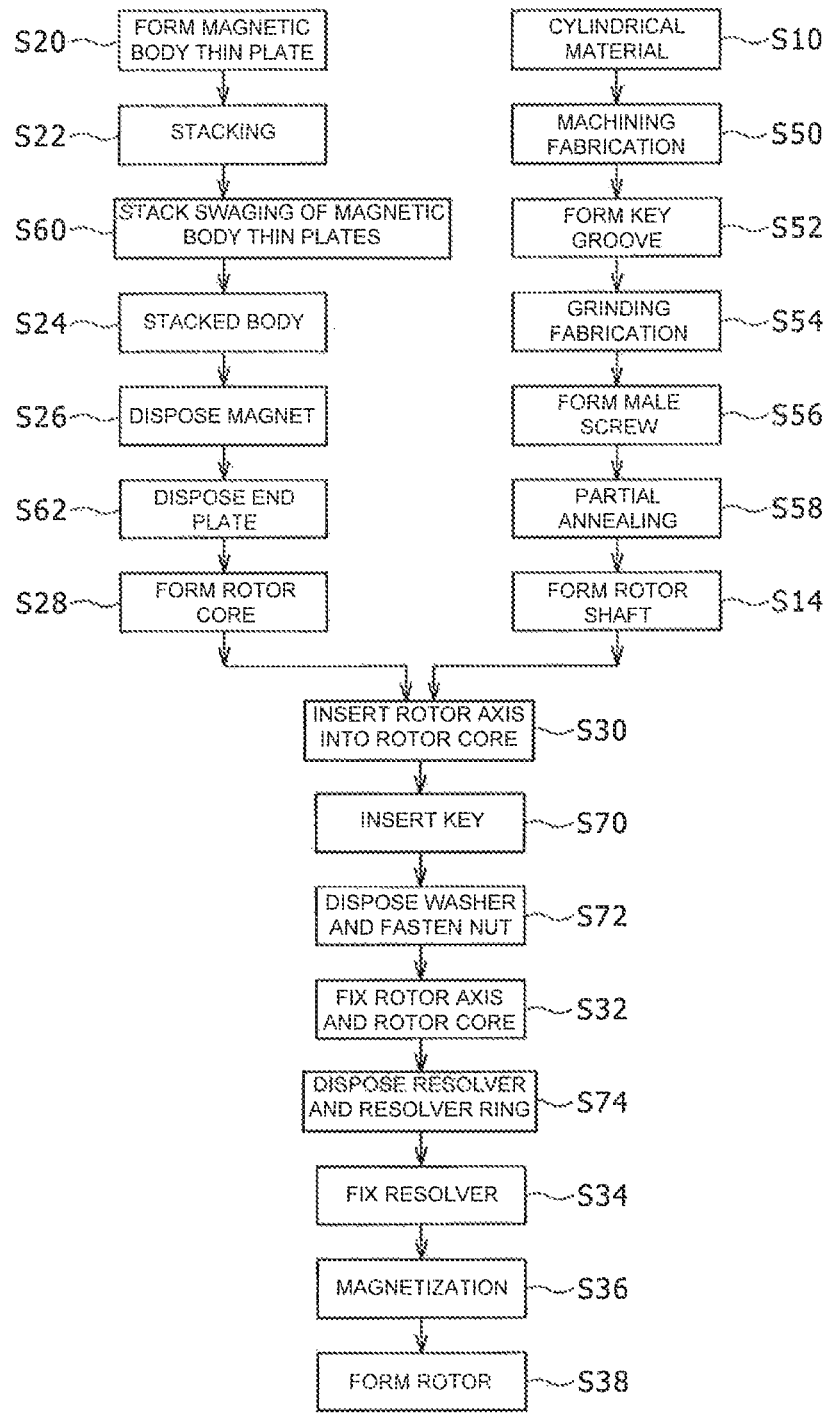
FIG. 19 is a flowchart illustrating the procedure of a method of manufacturing the rotational electric machine rotor illustrated in FIG. 18.

FIGS. 18 and 19 are diagrams illustrating a rotational electric machine rotor 130 according to a conventional technology as a comparative example. FIG. 18 is a cross-sectional view corresponding to FIG. 1, and FIG. 19 is a flowchart illustrating the procedure of a method of manufacturing the rotational electric machine rotor 130, which corresponds to FIG. 2. Hereinafter, the rotational electric machine rotor 130 is referred to as the rotor 130.

The rotor 130 includes a rotor shaft 140, a rotor core 160, and the resolver 70. The rotor shaft 140 includes an axis body part 142 having a circular section and holding the rotor core 40, a plurality of large diameter parts 144, 146, and 148 having outer diameters different from each other, and a small diameter part 150 fitted to the center hole of the resolver 70. The axis body part 142 includes a male screw part 152 formed on the one side in the axial direction, and a key groove 154 used to prevent rotation relative to the rotor core 40.

The rotor core 160 includes a plurality of magnetic body thin plates 162, the plurality of magnet through-holes 50, and the plurality of permanent magnets 60, and also includes a center hole 164 in which the axis body part 142 of the rotor shaft 140 is inserted. The rotor core 160 further includes a stack swaging part 166 connecting the plurality of magnetic body thin plates 162 to one another. The rotor core 160 further includes end plates 170 and 172 disposed on both axial-direction ends of the rotor core 160 and used for, for example, magnetic force shielding and scattering prevention of the permanent magnets 60 disposed in the magnet through-holes 50.

A nut 180 is a fastening member that sandwiches the rotor core 160 with the large diameter part 144, is meshed with the male screw part 152 formed at the axis body part 142 of the rotor shaft 140, and fixes the rotor core 160 to the rotor shaft 140. A washer 182 is a spacer disposed between the nut 180 and the end plate 170 to obtain fastening force. A resolver ring 184 is a fixation ring that sandwiches the resolver 70 with the large diameter part 148 and fixes the resolver 70.

FIG. 19 is a flowchart illustrating the procedure of a method of manufacturing the rotor 130, in which a processing procedure common to that in FIG. 2 is denoted by an S number the same as that in FIG. 2, and detailed description thereof will be omitted.

In a procedure related to formation of the rotor shaft 140, a cylindrical material is prepared (S10), and machining fabrication (S50) is performed after forging and annealing to form an outer shape including the plurality of large diameter parts 144, 146, and 148 and the small diameter part 150 described with reference to FIG. 18. After the outer shape formation, key groove formation (S52) is performed. Then, a grinding process (S54) is performed to achieve a predetermined surface roughness accuracy. Then, screw machining is performed to form the male screw part 152 at the axis body part 142 of the rotor shaft 140 (S56). Further, partial annealing processing is performed at a necessary place such as a contact part to have predetermined strength (S58). The processing order of these processes may be changed as appropriate in accordance with contents such as a fabrication facility. When all of these processing procedures are completed, the rotor shaft 140 is formed (S14).

In the procedure of forming the rotor core 160, each magnetic body thin plate 162 is formed (S20), and then the plurality of magnetic body thin plates 162 are stacked by positioning the center hole 164, the magnet through-holes 50, and the outer shape thereof (S22). Then, stack swaging processing is performed to swage and fix the plurality of magnetic body thin plates 162 to each other (S60), thereby forming a stacked body (S24). Subsequently, the permanent magnets 60 are disposed in the plurality of respective magnet through-holes 50 (S26). The plurality of magnet through-holes 50 and the plurality of permanent magnets 60 are the same as those described with reference to FIG. 6. Thereafter, the end plates 170 and 172 are disposed at both axial-direction ends of the rotor core 160, respectively, and fixed to the stacked body by using an appropriate fastening jig (S62). When all of these processing procedures are completed, the rotor core 160 is formed (S28).

In the procedure of forming the rotor 130 from the rotor core 160 and the rotor shaft 140, first, the rotor shaft 140 is inserted into the rotor core 160 (S30). Then, key insertion is performed by using the key groove 154 of the rotor shaft 140 to prevent rotation of the rotor shaft 140 and the rotor core 160 relative to each other (S70). Subsequently, the axial-direction end face of the rotor core 160 on the other side is pressed against the axial-direction end face of the large diameter part 144 on the one side, and the washer 182 is fitted to the axis body part 142 of the rotor shaft 140 and disposed, and then, the nut 180 is meshed with and fastened to the male screw part 152 of the axis body part 142 (S72). Accordingly, the rotor shaft 140 and the rotor core 160 are fixed to each other (S32). Subsequently, the resolver 70 is fitted to the small diameter part 150 and disposed on the axial-direction end face of the large diameter part 148 on the other side, and then the resolver ring 184 is disposed on the axial-direction end face of the resolver 70 on the other side (S74). In this state, while the resolver 70 is sandwiched between the large diameter part 148 and the resolver ring 184, the resolver ring 184 is fixed to the small diameter part 150 of the rotor shaft 140 by using appropriate fastening means (S34). Thereafter, the magnetization processing (S36) of the permanent magnet 60 is performed. When all of these processing procedures are completed, the rotor 130 illustrated in FIG. 18 is formed.

Comparison between FIGS. 1 and 18 indicates that the rotor 130 according to the conventional technology needs the end plates 170 and 172, the nut 180, the washer 182, and the resolver ring 184. Comparison between FIGS. 2 and 19 indicates that the method of manufacturing the rotor 130 according to the conventional technology needs forging, annealing, and machining fabrication (S50) for formation of the plurality of large diameter parts 144, 146, and 148, and the small diameter part 150, and the key groove formation (S52) for rotation prevention. The method of manufacturing the rotor 130 according to the conventional technology further needs processing procedures of grinding fabrication (S54), formation of the male screw part 152 (S56), and partial annealing (S58). The method of manufacturing the rotor 130 according to the conventional technology further needs processing procedures of the stack swaging processing (S60) of magnetic body thin plates to form the stacked body of the rotor core 160, and the disposition (S62) of the end plates 170 and 172. The method of manufacturing the rotor 130 according to the conventional technology also needs the key insertion (S70) for preventing rotation of the rotor core 160 and the rotor shaft 140 relative to each other. The method of manufacturing the rotor 130 according to the conventional technology also needs processing procedures of the washer disposition and the nut fastening (S72) for fixing the rotor core 160 and the rotor shaft 140 to each other, and the disposition (S74) of the resolver 70 and the resolver ring 184 for fixing the resolver 70 to the rotor shaft 140. In this manner, the rotor 130 according to the conventional technology includes a larger number of components and needs a larger number of processing procedures of the manufacturing method therefor, which leads to increase of the cost of machining fabrication and increase of the material cost of cylindrical materials. In the rotor 10 described with reference to FIG. 1, the rotor shaft 20, the rotor core 40, and the resolver 70 are fixed by using the protruding parts 80, 82, and 84, which leads to reduction of the number of components, and reduction of processing procedures of the manufacturing method therefor. In this manner, the method of manufacturing a rotational electric machine rotor according to the present disclosure and the rotational electric machine rotor achieve reduction of the cost of assembling the rotor core 40 and the rotor shaft 20.

REFERENCE SIGNS LIST 8 cylindrical material
10, 12, 130 (rotational electric machine) rotor
20, 21, 140 rotor shaft
22, 26, 30 circular shaft
24, 25, 28 octagonal shaft
24a, 24b, 25a, 25b, 28b end part
40, 160 rotor core
42, 162 magnetic body thin plate
43, 44, 112, 164 center hole
46, 48 axial-direction end face
50, 52, 53, 54, 55 magnet through-hole
56 through-hole
60, 62, 63, 64, 65 permanent magnet
68 magnetic pole
70 resolver
72 upper surface
80, 82, 84, 86, 88 protruding part
90 gap 100a, 100b swaging jig
102a, 102b swaging surface
104a, 104b attachment hole
110, 110a, 110b metal ring
120 hexagon
122 serration
124 substantially elliptical shape
142 axis body part
144, 146, 148 large diameter part
150 small diameter part
152 male screw part
154 key groove
166 stack swaging part
170, 172 end plate
180 nut
182 washer
184 resolver ring

The invention claimed is:

1. A method of manufacturing a rotational electric machine rotor, the method comprising:
    forming a rotor shaft having a non-circular sectional outer shape;
    forming a rotor core by stacking a predetermined number of magnetic body thin plates each including a center hole having a non-circular shape corresponding to the non-circular sectional outer shape of the rotor shaft;
    inserting the rotor shaft into the non-circular center hole of the rotor core, and fitting, to the non-circular sectional outer shape of the rotor shaft, a metal ring including a center hole having a non-circular shape corresponding to the non-circular sectional outer shape of the rotor shaft;
    forming a protruding part for fixing the metal ring and the rotor shaft to each other by applying a predetermined pressure between both axial-direction end faces of the rotor core and squashing the rotor shaft extending out of an axial-direction end face of the metal ring by using a predetermined swaging jig to expand the rotor shaft outward beyond an outer periphery of the non-circular section along the axial-direction end face of the metal ring; and
    canceling the predetermined pressure and fixing the rotor core and the rotor shaft to each other through the metal ring.

2. The method of manufacturing a rotational electric machine rotor according to claim 1, wherein a position at which the protruding part is formed on the rotor shaft includes a position farthest from a barycenter position of the section of the rotor shaft.

3. The method of manufacturing a rotational electric machine rotor according to claim 1, wherein the non-circular shape is a polygon or serration.

4. The method of manufacturing a rotational electric machine rotor according to claim 1, wherein, in forming the rotor core, the predetermined number of the magnetic body thin plates are aligned with each other but are yet to be fixed to each other.

5. The method of manufacturing a rotational electric machine rotor according to claim 1, wherein
    the predetermined swaging jig includes a swaging surface for squashing the rotor shaft in a circumferential direction, and
    the swaging surface is tilted at a predetermined acute angle toward an outer peripheral side relative to a normal direction of an outer peripheral surface of the rotor shaft.

6. The method of manufacturing a rotational electric machine rotor according to claim 5, wherein
    the rotor shaft is inserted into a center hole of the polygon or serration of the rotor core through fitting by pressing, and
    a curvature radius of roundness of the center hole of the polygon or serration of the rotor core at an apex part of the polygon or serration is shorter than a curvature radius of roundness of the polygon or serration of the rotor shaft at an apex part of the polygon or serration.

* * * * *